US012472746B2

(12) United States Patent
Hashimoto et al.

(10) Patent No.: US 12,472,746 B2
(45) Date of Patent: Nov. 18, 2025

(54) INK JET PRINTER

(71) Applicant: KEYENCE CORPORATION, Osaka (JP)

(72) Inventors: Hajime Hashimoto, Osaka (JP); Hideki Yamakawa, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 154 days.

(21) Appl. No.: 18/378,814

(22) Filed: Oct. 11, 2023

(65) Prior Publication Data

US 2024/0140100 A1 May 2, 2024

(30) Foreign Application Priority Data

Oct. 28, 2022 (JP) ................................ 2022-173589

(51) Int. Cl.
*B41J 2/175* (2006.01)
*B41J 2/17* (2006.01)

(52) U.S. Cl.
CPC ......... *B41J 2/1707* (2013.01); *B41J 2/17513* (2013.01); *B41J 2/17523* (2013.01); *B41J 2/17596* (2013.01)

(58) Field of Classification Search
CPC ...... B41J 2/1707; B41J 2/175; B41J 2/17506; B41J 2/17509; B41J 2/17513; B41J 2/17523; B41J 2/17596
See application file for complete search history.

(56) References Cited

U.S. PATENT DOCUMENTS

| | | | |
|---|---|---|---|
| 9,144,992 B2 | 9/2015 | Yamakawa | |
| 9,387,684 B2 | 7/2016 | Ogawa et al. | |
| 2006/0103700 A1* | 5/2006 | Taira ...................... | B41J 2/1707 347/85 |
| 2008/0316251 A1* | 12/2008 | Heo ..................... | B41J 2/16552 347/28 |
| 2015/0197096 A1* | 7/2015 | Yamakawa .......... | B41J 2/17523 347/7 |
| 2016/0107451 A1* | 4/2016 | Mochizuki ................. | B41J 2/18 347/89 |

FOREIGN PATENT DOCUMENTS

JP 2022-26363 A 2/2022

* cited by examiner

*Primary Examiner* — Anh T Vo
(74) *Attorney, Agent, or Firm* — WHDA, LLP

(57) ABSTRACT

To prevent a failure of an ink jet printer due to ink clogging in a hollow needle and the vicinity thereof. A continuous ink jet printer includes: an ink tank that stores ink and a solvent as a printing ink; a printing head that performs printing with the printing ink; an ink hollow needle that accesses the ink in an ink cartridge when an ink reservoir receives the ink cartridge; a first ink tube that causes the ink to flow from the ink hollow needle to the ink tank; and a supply control section that executes suction control to generate a flow from the ink hollow needle toward the first ink tube when the ink is taken out from the ink cartridge received in the ink reservoir, and executes blowing control to generate a flow from the first ink tube toward the ink hollow needle when reverse-flow cleaning is performed.

13 Claims, 19 Drawing Sheets

·SUCTION CONTROL (IN NON-BLOCKAGE)

·SUCTION CONTROL (1): BEFORE ELIMINATION

·BLOWING CONTROL (2): BEFORE ELIMINATION

·BLOWING CONTROL (2): AFTER ELIMINATION

INK JET PRINTER

CROSS-REFERENCE TO RELATED APPLICATIONS

The present application claims foreign priority based on Japanese Patent Application No. 2022-173589, filed Oct. 28, 2022, the contents of which are incorporated herein by reference.

BACKGROUND OF THE INVENTION

1. Field of the Invention

The disclosure relates to a continuous ink jet printer.

2. Description of Related Art

Conventionally, an ink jet printer configured to perform printing on a workpiece or the like has been known.

For example, JP 2022-026363 A discloses a so-called continuous ink jet printer in which ink is circulated inside the printer even when printing is not performed on a workpiece. The ink jet printer includes a reservoir that receives attachment of an ink cartridge, and a hollow needle configured to take out ink in the ink cartridge.

According to JP 2022-026363 A, when the ink cartridge is received in the reservoir, the hollow needle pierces a bottle of the ink cartridge, and the hollow needle enters the bottle.

This allows the ink in the ink cartridge to be taken out through the hollow needle.

By the way, an internal space of the hollow needle and an internal space of an ink flowing tube in the vicinity of the hollow needle as described in JP 2022-026363 A are generally narrower than other flow channels in the ink jet printer.

Therefore, in a case where ink in which coloring components are not completely dissolved in a solvent, such as a so-called pigment ink, is used in the ink jet printer, it is necessary to break down a lump of the coloring components by shaking the ink cartridge in advance such that the lump caused by sedimentation of the coloring components is not clogged in the hollow needle and the internal space in the vicinity thereof.

However, in an actual site, there may be a situation in which shaking of the ink cartridge itself is forgotten, or the lump of the coloring components is not broken as a result of insufficient shaking of the ink cartridge. If the ink cartridge is attached to the reservoir in such a state, the lump of the coloring components is clogged in the above-described internal space, which may cause a failure of the ink jet printer. In this case, even replacement of the hollow needle is likely to be required, which is inconvenient in terms of labor and cost.

Note that even in ink other than the pigment ink, that is, a dye ink, a case where coloring components are not completely dissolved is assumed. Therefore, the above-described problem may occur in both the pigment ink and the dye ink.

SUMMARY OF THE INVENTION

The disclosure has been made in view of such a point, and an object thereof is to prevent a failure of an ink jet printer due to ink clogging at a hollow needle and the vicinity thereof.

According to one embodiment of the disclosure, a continuous ink jet printer is provided. The ink jet printer includes: an ink reservoir that detachably receives an ink cartridge in which ink is contained; a solvent reservoir that detachably receives a solvent cartridge in which a solvent is contained; an ink tank that stores, as a printing ink, the ink from the ink cartridge received in the ink reservoir and the solvent from the solvent cartridge received in the solvent reservoir; a printing head that performs printing with the printing ink from the ink tank; a hollow needle that accesses the ink in the ink cartridge when the ink reservoir receives the ink cartridge; an ink flowing tube that connects the hollow needle and the ink tank and causes the ink to flow from the hollow needle to the ink tank; and a supply control section that executes suction control to generate a flow from the hollow needle toward the ink flowing tube when the ink is taken out from the ink cartridge received in the ink reservoir, and executes blowing control to generate a flow from the ink flowing tube toward the hollow needle when reverse-flow cleaning is performed on a path of the flow.

According to the one embodiment, the flow from the ink flowing tube toward the hollow needle can be generated by executing the blowing control. With this flow, obstructions clogged in internal spaces of the hollow needle and the vicinity thereof can be discharged from the internal spaces.

At this time, when the flow in the opposite direction is used instead of the flow from the hollow needle toward the ink flowing tube as in the suction control, it is possible to more reliably discharge the obstructions without driving the obstructions to a deep portion of the ink flowing tube. Thus, it is possible to prevent a failure of the ink jet printer due to ink clogging in the hollow needle and the vicinity thereof.

In addition, replacement of the hollow needle and the ink flowing tube becomes unnecessary by discharging the obstruction as in the one embodiment. The ink clogging in the hollow needle and the vicinity thereof can be eliminated without sending the printer to a manufacturer or inviting a repair person from the manufacturer. This is also advantageous in terms of labor and cost.

In addition, according to another embodiment of the disclosure, the ink may be made of a pigment ink.

The pigment ink has an advantage that a color is clear and coloring power is strong, but has a disadvantage that a part of a coloring component (pigment component) settles to form a lump unless periodic stirring is performed. Thus, the pigment ink is more likely to clog the hollow needle and the ink flowing tube in the vicinity thereof as compared with a dye ink. Therefore, the disclosure is particularly effective in the case of using the ink made of the pigment ink.

In addition, according to still another embodiment of the disclosure, the ink jet printer may further include: a suction pump that is arranged in the middle of the ink flowing tube and configured to perform suction to generate the flow from the hollow needle toward the ink flowing tube; a joining section that is arranged in the ink flowing tube between the hollow needle and the suction pump and causes the solvent or the ink to join in the ink flowing tube; and an on-off valve that is arranged in the ink flowing tube between the joining section and the suction pump and opens and closes a flow channel of the ink flowing tube, and the supply control section may execute the suction control by bringing the on-off valve into an open state and operating the suction pump when the ink is taken out from the ink cartridge received in the ink reservoir, and execute the blowing control by bringing the on-off valve into a closed state and supplying the solvent or the ink via the joining section when the reverse-flow cleaning is performed on the path of the flow.

According to the still another embodiment, when the blowing control is executed, the on-off valve that is in the open state in the suction control is brought into the closed state. This prevents the solvent or the ink supplied via the joining section from being drawn into the suction pump side, and the reverse-flow cleaning can be more appropriately performed.

In addition, according to still another embodiment of the disclosure, the ink jet printer may further include: a solvent flowing tube that causes the solvent to flow in the solvent cartridge to the joining section when the solvent reservoir receives the solvent cartridge; a solvent pump that is arranged in a middle of the solvent flowing tube and operated to generate a flow from the solvent flowing tube toward the hollow needle via the joining section and the ink flowing tube; and a second on-off valve that is arranged in the solvent flowing tube between the joining section and the solvent pump and opens and closes a flow channel of the solvent flowing tube, and the supply control section may execute the suction control by bringing the on-off valve into the open state, bringing the second on-off valve into a closed state, and operating the suction pump when the ink is taken out from the ink cartridge received in the ink reservoir, and execute the blowing control by bringing the on-off valve into the closed state, bringing the second on-off valve to an open state, and operating the solvent pump when the reverse-flow cleaning is performed on the path of the flow.

According to the still another embodiment, the supply control section executes the blowing control by supplying the solvent from the solvent cartridge to the joining section. This makes it possible to implement the blowing control without preparing a new fluid to be flowed at the time of reverse-flow cleaning. This can reduce the manufacturing cost of the printer and make it more advantageous in terms of cost. In addition, the ink clogging can be dissolved with the solvent by executing the blowing control with the solvent. As a result, the ink clogging in the hollow needle and the vicinity thereof can be more reliably eliminated.

In addition, according to still another embodiment of the disclosure, the ink jet printer may further include: a second ink flowing tube that connects the ink tank and the joining section and causes the printing ink to flow from the ink tank to the joining section; an ink pump that is arranged in a middle of the second ink flowing tube and operated to generate a flow from the second ink flowing tube toward the hollow needle via the joining section and the ink flowing tube; and a third on-off valve that is arranged in the second ink flowing tube between the joining section and the ink pump and opens and closes a flow channel of the second ink flowing tube, and the supply control section may execute the suction control by bringing the on-off valve into the open state, bringing the third on-off valve into a closed state, and operating the suction pump when the ink is taken out from the ink cartridge received in the ink reservoir, and execute the blowing control by bringing the on-off valve into the closed state, bringing the third on-off valve to an open state, and operating the ink pump when the reverse-flow cleaning is performed on the path of the flow.

According to the still another embodiment, the supply control section executes the blowing control by supplying the printing ink from the ink tank to the joining section. This makes it possible to implement the blowing control without preparing a new fluid to be flowed at the time of reverse-flow cleaning. This can reduce the manufacturing cost of the printer and make it more advantageous in terms of cost.

In addition, according to still another embodiment of the disclosure, the ink jet printer may include a switch electrically connected to the supply control section, and the supply control section may start the blowing control when the switch is operated.

According to the still another embodiment, the blowing control can be manually started. As a result, the ink clogging in the hollow needle and the vicinity thereof can be eliminated at a timing desired by a user.

In addition, according to still another embodiment of the disclosure, the supply control section may start the blowing control when the switch is operated, regardless of whether or not the ink cartridge received in the ink reservoir contains the ink.

If ink is contained in the ink cartridge, ink or a solvent discharged into the ink cartridge by the blowing control will be mixed with the previously contained ink. This may increase or decrease an ink concentration in the cartridge. However, in the case of the continuous ink jet printer, an ink concentration is adjusted in the ink tank. Thus, even if the ink concentration increases or decreases in the cartridge, the influence on printing by the printing head can be minimized.

In addition, according to still another embodiment of the disclosure, the ink jet printer may include a detector that detects a blocked state in the hollow needle and a blocked state in the ink flowing tube between the hollow needle and the joining section portion, and the supply control section may start the blowing control based on a detection result of the detector.

According to the still another embodiment, the blowing control can be automatically started. As a result, the ink clogging in the hollow needle and the vicinity thereof can be more reliably eliminated.

In addition, according to still another embodiment of the disclosure, the ink jet printer may include a notification section that notifies a user of information, and the supply control section may execute the blowing control over a predetermined period, and cause the notification section to notify that the blowing control is terminated after a lapse of the predetermined period.

In addition, according to still another embodiment of the disclosure, the ink jet printer may include a display section that displays information to a user, and the display section may display guidance information for guiding the user to stir the ink cartridge received in the ink reservoir when the blowing control by the supply control section is terminated.

According to the still another embodiment, recurrence of ink clogging can be suppressed by displaying the guidance information to the user through the display section. This can more reliably prevent the failure of the ink jet printer due to the ink clogging in the hollow needle and the vicinity thereof.

As described above, it is possible to prevent the failure of the ink jet printer due to the ink clogging at the hollow needle and the vicinity thereof according to the disclosure.

DETAILED DESCRIPTION OF PREFERRED EMBODIMENTS

Hereinafter, an embodiment of the disclosure will be described with reference to the drawings. Note that the following description is given as an example.

That is, an industrial ink jet printer will be described as an example of an ink jet printer in the present specification, but the technology disclosed herein can be applied to general devices configured to fly particulate ink to land on a printing target such as a workpiece regardless of names such as the ink jet printer and the industrial ink jet printer.

In addition, printing by the ink jet printer will be described in the present specification, but the "printing" referred to herein includes all processing processes to which ink jet is applied, such as printing of characters and marking of figures.

<Overall Configuration>

Figure 1:
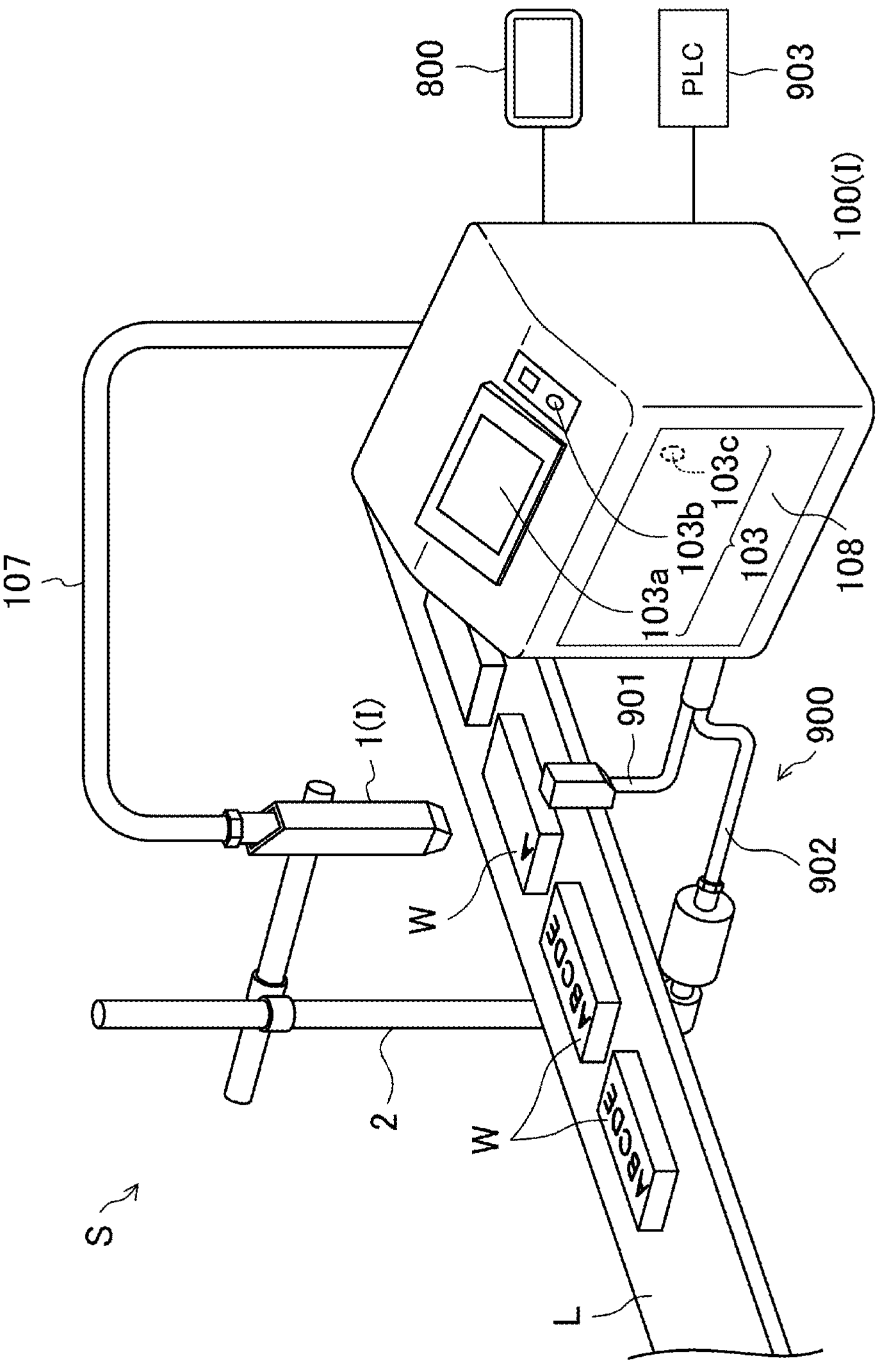
FIG. 1 is a diagram illustrating an overall configuration of an ink jet recording system.
Figure 2:
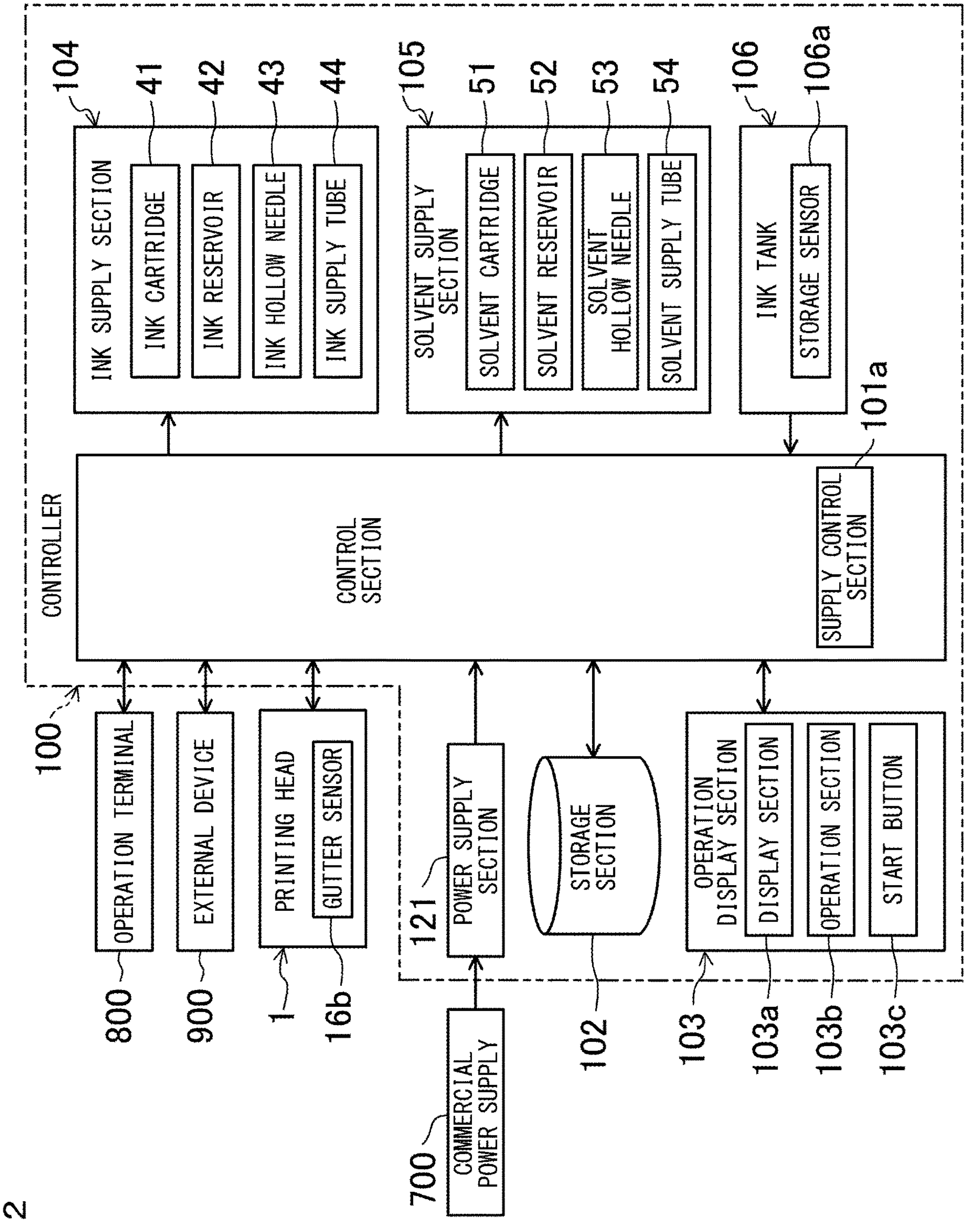
FIG. 2 is a block diagram illustrating a schematic configuration of an ink jet printer.
Figure 3:
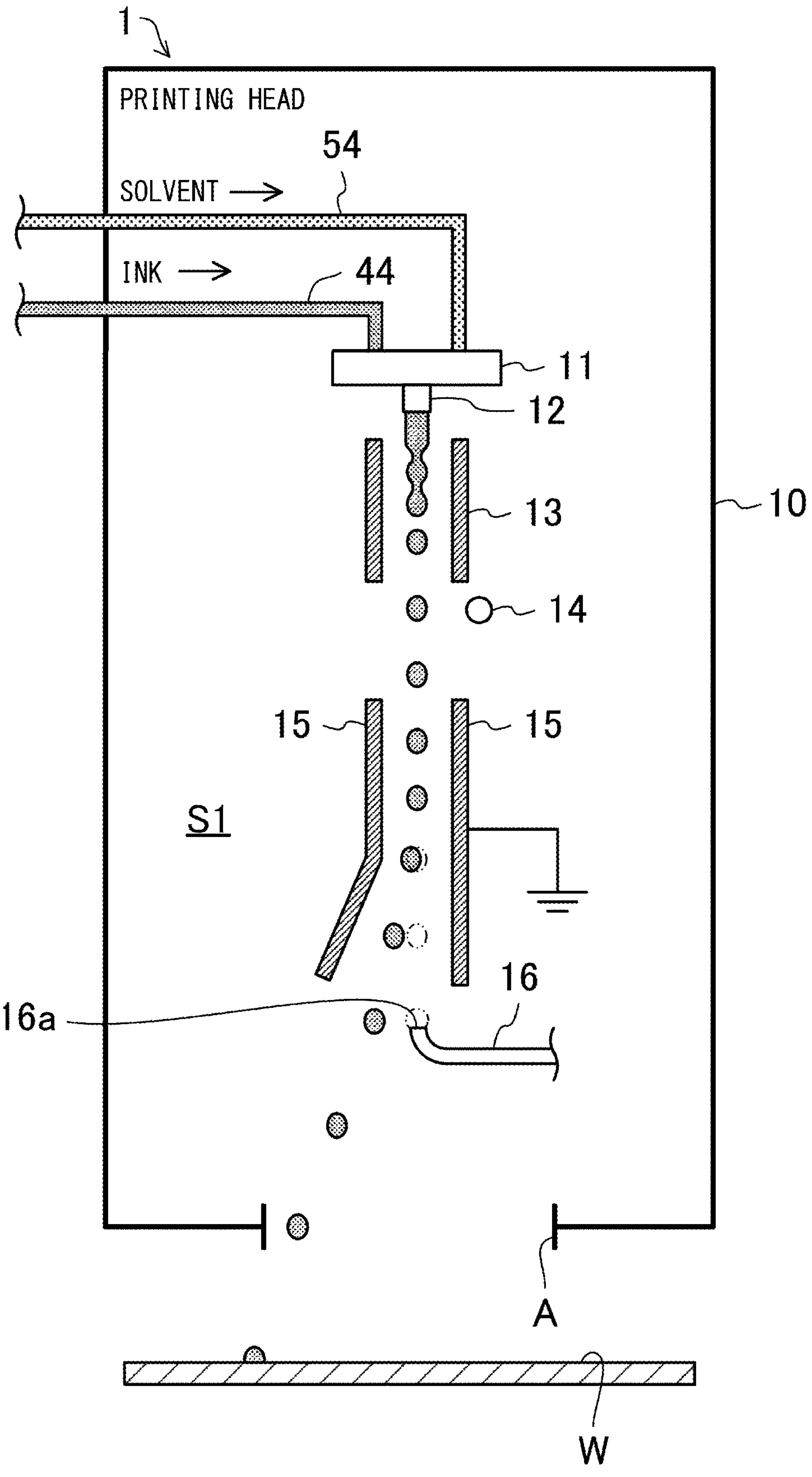
FIG. 3 is a diagram illustrating a schematic configuration of a printing head.
Figure 4:
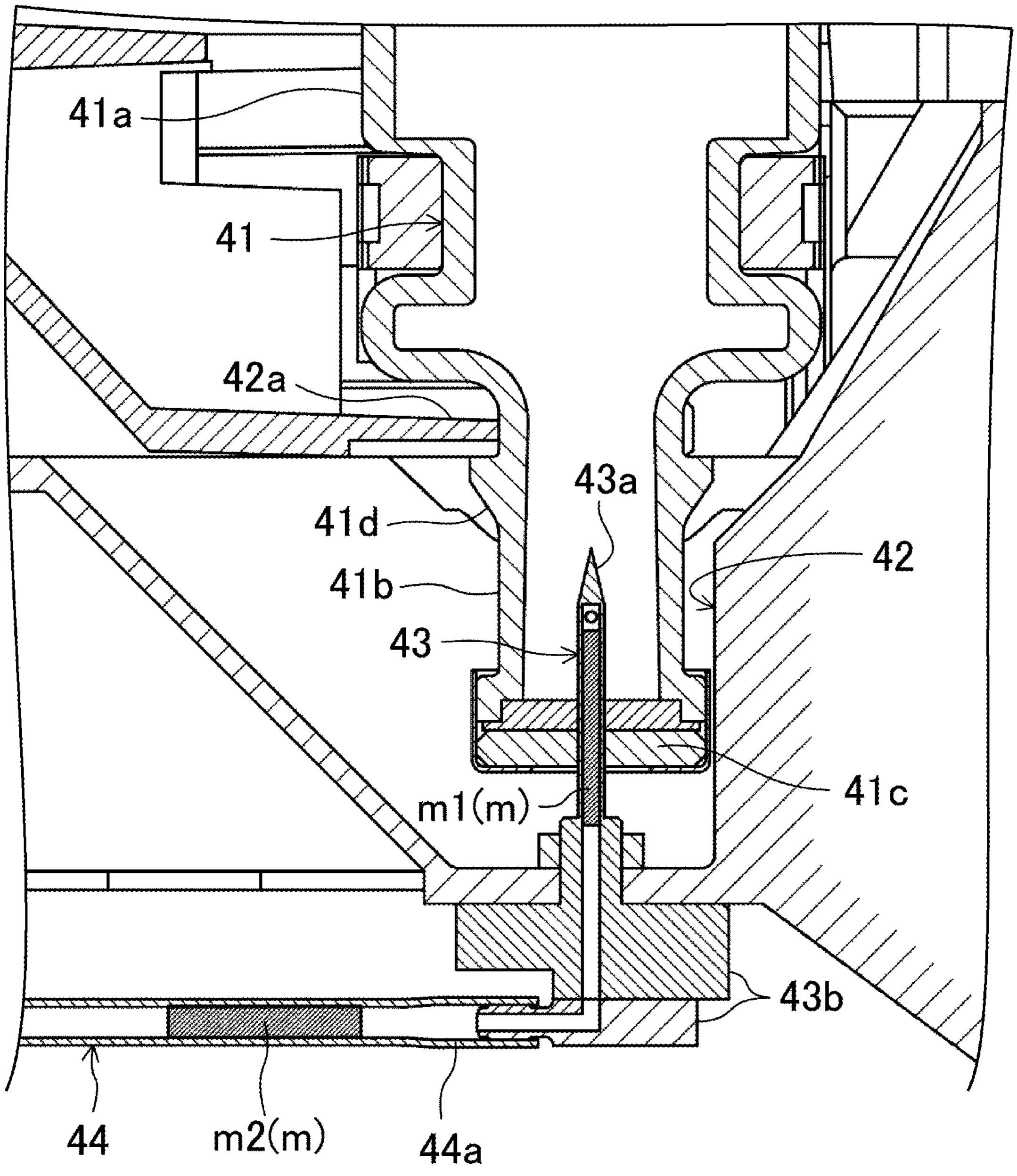
FIG. 4 is a diagram illustrating a connection structure between an ink cartridge and an ink reservoir.
Figure 5:
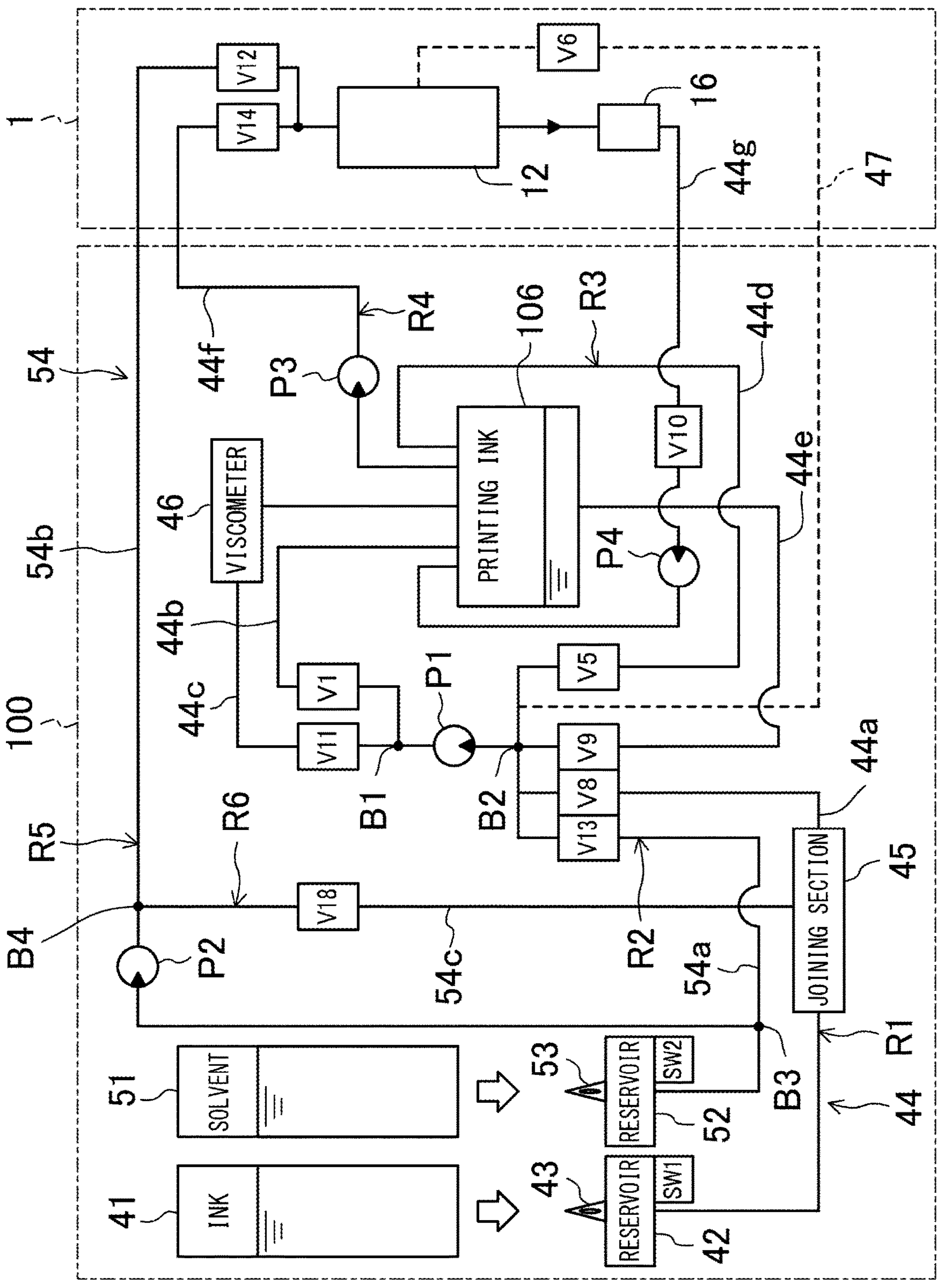
FIG. 5 is a diagram illustrating paths of ink and a solvent in the ink jet printer.

FIG. 1 is a diagram illustrating an overall configuration of an ink jet recording system S. In addition, FIG. 2 is a diagram illustrating a schematic configuration of an ink jet printer I, and FIG. 3 is a diagram illustrating a schematic configuration of a printing head 1 in the ink jet printer I. Further, FIG. 4 is a diagram illustrating a connection structure between an ink cartridge 41 and an ink reservoir 42, and FIG. 5 is a diagram illustrating paths of ink and a solvent in the ink jet printer I. The ink jet recording system S illustrated in FIG. 1 is installed in a conveyance line L in a factory or the like, for example, and is configured to sequentially perform printing on each printing target W flowing along the conveyance line L. Note that an application target of the disclosure is not limited to the ink jet recording system S. The disclosure can be applied to a printing system using a method other than an automatic method. The conveyance line L can be configured using, for example, a belt conveyor or the like.

Specifically, the ink jet recording system S includes the ink jet printer I that performs printing by causing particulate ink (ink droplet) to land on the printing target W, and an operation terminal 800 and an external device 900 which are connected to the ink jet printer I. Note that the operation terminal 800 and the external device 900 are not essential.

The ink jet printer I illustrated in FIGS. 1 to 3 includes the printing head 1 that ejects ink droplets from a nozzle 12 and causes the ink droplets to land on the printing target W, and a controller 100 that supplies a control signal, the ink, and the solvent to the printing head 1. The controller 100 supplies the control signal to the printing head 1 to control trajectories of the ink droplets. As a result, landing positions of the ink droplets on the printing target W are adjusted, and desired printing is implemented. The printing head 1 is fixed at a predetermined position by a support member 2 or the like.

The ink jet printer I is a continuous ink jet printer (CIJ). That is, even when the ink jet printer I is not executing printing, the ink constantly circulates inside the ink jet printer I as long as the ink jet printer I is in an operating state in order to prevent clogging (in particular, clogging of the nozzle 12) and the like due to volatilization of the ink. By adopting the continuous type, a quick-drying ink can be used without causing clogging by the ink.

In addition, the ink according to the present embodiment is made of a pigment ink in which a coloring component is not completely dissolved in the solvent. Instead of the pigment ink, ink made of a dye ink may be used.

In addition, the ink jet printer I according to the present embodiment is configured such that each part of the printing head 1 such as the nozzle 12 can be cleaned by sending the solvent to the printing head 1. The solvent used in the cleaning can be recovered as necessary and reused to adjust the concentration (viscosity) of the ink.

In order to implement the circulation of the ink, the printing head 1 includes a gutter 16 that recovers the ink or the solvent ejected from the nozzle 12 in addition to the nozzle 12 that ejects the ink or the solvent (see FIG. 3). The ink or the solvent fed from the controller 100 to the printing head 1 is ejected from the nozzle 12 and recovered by the gutter 16. The ink or solvent thus recovered is sent back to the controller 100 to be reused. The ink can be circulated by repeating such steps.

Meanwhile, the operation terminal 800 has, for example, a central processing unit (CPU) and a storage apparatus, and is connected to the controller 100. The operation terminal 800 functions as a terminal configured to define printing settings and show information related to printing to a user.

The printing settings set by the operation terminal 800 are output to the controller 100 and stored in a storage section 102 thereof. The operation terminal 800 may store the printing settings in addition to the storage section 102 of the controller 100 or instead of the storage section 102.

Note that the printing settings according to the present embodiment may include conditions and parameters related to suction control and blowing control to be described later, in addition to a content of a character string or the like that needs to be printed.

Note that the operation terminal 800 can be integrated into the controller 100, for example. In this case, a term "control unit" or the like is used instead of the term "operation terminal".

The external device 900 is connected to the controller 100 as necessary. In the example illustrated in FIGS. 1 and 2, a workpiece detection sensor 901, a conveyance speed sensor 902, and a programmable logic controller (PLC) 903 are provided as the external device 900.

Specifically, the workpiece detection sensor 901 detects the presence or absence of the printing target W on the conveyance line L, and outputs a signal (detection signal) indicating a result of the detection to the controller 100. The detection signal output from the workpiece detection sensor 901 functions as a trigger (printing trigger) for starting printing.

The conveyance speed sensor 902 is configured using, for example, a rotary encoder, and can detect a conveyance speed of the printing target W. The conveyance speed sensor 902 outputs a signal (detection signal) indicating a result of the detection to the controller 100. The controller 100 controls a timing or the like for ejecting the ink droplets from the printing head 1 based on the detection signal input from the conveyance speed sensor 902.

In addition, the PLC 903 is electrically connected to the controller 100 as illustrated in FIG. 2. The PLC 903 is used to control the ink jet recording system S according to a predetermined sequence.

In addition to the above-described devices and apparatuses, an apparatus configured to perform operation and control, a computer configured to perform various other processes, a storage apparatus, a peripheral device, and the like can be connected to the ink jet printer I. A connection scheme in this case may be either wired connection or wireless connection.

<Controller 100>

The controller 100 is configured to be capable of electrically controlling the printing head 1 and supplying a printing ink and a solvent for diluting the ink to the printing head 1.

Specifically, the controller 100 according to the present embodiment includes, as constituent elements related to electrical control, the storage section 102 that stores the above-described printing settings, a control section 101 that controls the controller 100 and each section of the printing head 1, an operation display section 103 that receives an operation by the user and displays information to the user, and a power supply section 121 that guides power supplied from the outside to the control section 101.

The controller 100 also includes an ink supply section 104, a solvent supply section 105, and an ink tank 106 as constituent elements related to supply of the ink and the like. These constituent elements are in direct or indirect fluid connection with the printing head 1.

As described later, the ink supply section 104 includes the ink reservoir 42 that detachably receives the ink cartridge 41 in which ink is contained. Meanwhile, the solvent supply section 105 includes a solvent reservoir 52 that detachably receives a solvent cartridge 51 in which a solvent is contained. The ink reservoir 42 can also receive an empty solvent cartridge 51 although related to the blowing control to be described later.

In addition, the ink tank 106 stores, as a printing ink, the ink from the ink cartridge 41 received in the ink reservoir 42 and the solvent from the solvent cartridge 51 received in the solvent reservoir 52. The "printing ink" herein means a mixture of the solvent and the ink (for example, the ink whose concentration has been adjusted by the solvent).

Further, the printing head 1 performs printing with the printing ink from the ink tank 106. The printing head 1 also cleans the nozzle 12 and the like with the solvent supplied from the solvent supply section 105 while bypassing the ink tank 106.

The control section 101 may be configured as a separate unit from the ink supply section 104 and the solvent supply section 105. The storage section 102 may also be configured as a separate unit from the ink supply section 104 and the solvent supply section 105. The operation display section 103 may also be configured as a separate unit from the ink supply section 104 and the solvent supply section 105. Also in these cases, the constituent elements can be combined into the controller 100.

In addition, considering the ink supply section 104 and the ink tank 106 as independent constituent elements is merely a classification for convenience. From the viewpoint of being related to the ink supply, the ink tank 106 may be considered as an element of the ink supply section 104.

(Storage Section 102)

The storage section 102 is configured to store printing settings set via the operation display section 103 to be described later or the operation terminal 800, and output the stored printing settings to the control section 101 based on a control signal from the outside.

Specifically, the storage section 102 is configured using a volatile memory, a non-volatile memory, a solid state drive (SSD), a hard disk drive (HDD), or the like, and can temporarily or consistently store information indicating the printing settings. Note that the operation terminal 800 may also serve as the storage section 102 in a case where the operation terminal 800 is incorporated in the controller 100.

(Control Section 101)

The control section 101 controls at least the ink supply section 104 and the solvent supply section 105 in the controller 100 and the nozzle 12, a charging electrode 13, and a deflection electrode 15 in the printing head 1 based on the printing settings stored in the storage section 102. The control section 101 controls each section to perform printing on the printing target W at a predetermined timing.

Specifically, the control section 101 includes, for example, a CPU, a memory, an input/output bus, and the like, and generates a control signal based on a signal indicating information input via the operation display section 103 or the operation terminal 800 and a signal indicating the printing settings read from the storage section 102. The control section 101 outputs the control signal thus generated to the controller 100 and each section of the ink jet printer I to control printing on the printing target W.

For example, when printing is performed on the printing target W, the control section 101 reads a printing content on the printing target W stored in the storage section 102 and generates a control signal based on the printing content. Further, the control section 101 outputs the control signal to the charging electrode 13 to set a flying direction of an ink droplet so as to implement a landing position corresponding to the printing content.

—Other Functional Elements in Control Section 101—

In addition, the ink jet printer I according to the present embodiment includes a supply control section **101*a* that controls supply of the ink from the ink cartridge 41 and supply of the solvent from the solvent cartridge 51**.

Here, the supply control section **101*a* controls the supply of each of the ink and the solvent by operating (in particular, controlling an opening degree of each on-off valve) each of the ink supply section 104 and the solvent supply section 105. The supply control section 101*a*** controls the supply of each of the ink and the solvent, thereby implementing the suction control and the blowing control in the present embodiment. Details of the suction control and the blowing control will be described later.

(Operation Display Section 103)

As illustrated in FIG. 1, the operation display section 103 includes a display section 103*a* that displays information to the user, an operation section 103*b* that receives an operation by the user, and a start button 103*c*. The operation display section 103 can be provided in, for example, a housing or the like constituting the controller 100, but may be configured separately from the housing and set at a location different from the housing. In addition, the operation terminal 800 may also serve as the operation display section 103 in a case where the operation terminal 800 is incorporated in the controller 100.

The display section 103*a* displays various types of information related to the ink jet printer I. The display section 103*a* is configured using, for example, a liquid crystal display panel, an organic EL display panel, or the like, and changes a display mode in response to a control signal from the control section 101. The display section 103*a* can display a user interface for operating each section of the ink jet recording system 8, a user interface for defining printing settings, and information related to the above-described suction control and blowing control. The display section 103*a* can notify the user of visual information, and forms a "notification section" in the present embodiment. Note that it is not essential to form the notification section using the display section 103*a*. For example, the notification section may be configured using by a speaker that notifies the user of voice information, or the notification section may be configured using another visual mechanism such as an LED lamp.

The operation section 103*b* includes, for example, a touch operation panel, a button, a switch, and the like. When the user operates the operation section 103*b*, information (operation information) corresponding to such an operation input is input to the control section 101, and the control section 101 can detect which operation has been performed. For example, it is possible to switch ON and OFF of power or the like of the ink jet printer I, and to perform various settings, input of information, and the like by operating the operation section 103*b*. The operation section 103*b* forms an "input section" that can input various types of information.

The operation display section 103 can also set printing settings similarly to the operation terminal 800 described above. The printing settings set by the operation display section 103 are output to the controller 100 and stored in the storage section 102. In the following description, the description is given assuming a case where the user operates the operation display section 103, but the operation terminal 800 can also be used instead of the operation display section 103.

The start button 103*c* is a switch electrically connected to the supply control section 101*a*, and can cause the supply control section 101*a* to start the blowing control. Specifically, the start button 103*c* according to the present embodiment is configured as a physical switch (for example, a push button) configured separately from the operation section 103*b*. In order to press the start button 103*c*, it is necessary to open a door section 108 provided on a front surface of the controller 100 (see FIG. 1).

(Ink Supply Section 104)

The ink supply section 104 supplies the ink from the ink cartridge 41 to the nozzle 12 of the printing head 1 as the printing ink. At this time, the ink from the ink supply section 104 is supplied to the printing head 1 via the ink tank 106.

Specifically, the ink supply section 104 according to the present embodiment includes, as main constituent elements, the above-described ink cartridge 41 and ink reservoir 42, an ink hollow needle 43 as a hollow needle, and an ink supply tube 44. The ink hollow needle 43 fluidly connects the ink cartridge 41 and the ink supply tube 44. The ink supply tube 44 fluidly connects the ink cartridge 41 and the printing head 1 via the ink hollow needle 43. The ink tank 106 is arranged in the middle of the ink supply tube 44 from the ink hollow needle 43 to the printing head 1.

The ink is contained in the ink cartridge 41 among them. The ink reservoir 42 detachably receives the ink cartridge 41. The ink can be replenished to the ink tank 106 by replacing the ink cartridge 41 with respect to the ink reservoir 42. That is, the ink jet printer I according to the present embodiment is configured as a so-called "cartridge" ink jet printer. Note that the ink cartridge 41 here includes an empty cartridge that actually contains no ink.

Note that the ink reservoir 42 is provided with a first mounting sensor SW1 that detects mounting of the ink cartridge 41 or the solvent cartridge 51 to the ink reservoir 42 as illustrated in FIG. 5.

The ink hollow needle 43 accesses the ink in the ink cartridge 41 when the ink reservoir 42 receives the ink cartridge 41 (when the ink cartridge 41 is attached to the ink reservoir 42).

Specifically, the ink cartridge 41 according to the present embodiment includes a bottle portion 41*a*, a mouth portion 41*b*, a mouth plug portion 41*c*, and a flange portion 41*d* (see FIG. 4). The bottle portion 41*a* is formed in a substantially bottomed cylindrical shape with one side in a central-axis direction being opened, and defines an internal space for containing the ink. The mouth portion 41*b* is configured by reducing a diameter of an opening end portion of the bottle portion 41*a*. The mouth plug portion 41*c* is configured using, for example, a rubber plug, and seals the mouth portion 41*b*. In addition, the flange portion 41*d* is provided on an outer wall around the mouth portion 41*b*, and is locked to a retaining portion 42*a* of the ink reservoir 42.

The ink reservoir 42 receives the ink cartridge 41 and positions the received ink cartridge 41. At this time, the flange portion 41*d* is locked to the retaining portion 42*a*, whereby the ink cartridge 41 can be prevented from coming out of the ink reservoir 42 even if a force in a direction in which the ink cartridge 41 comes out of the ink reservoir 42 (upward on the paper surface of FIG. 4) is applied to the ink cartridge 41.

In addition, the ink hollow needle 43 includes a needle body 43*a* and a connecting portion 43*b*. When the ink cartridge 41 is received in the ink reservoir 42, the needle body 43*a* pierces the bottle portion 41*a* of the ink cartridge 41 and enters the inside of the bottle portion 41*a*. The needle body 43*a* has a hollow needle shape. Therefore, the ink in the ink cartridge 41 can be taken out through an internal space of the needle body 43*a* by allowing the needle body 43*a* to enter the inside of the bottle portion 41*a*.

On the other hand, the connecting portion 43*b* of the ink hollow needle 43 is arranged on a proximal side (the opposite side of a needle tip) of the needle body 43*a* and connected to the ink reservoir 42. With this connection, the ink hollow needle 43 is fixed to the ink reservoir 42.

In addition, as illustrated in FIG. 4, a flow channel connected to an internal space of the ink hollow needle 43 is formed inside the connecting portion 43*b*. In addition, one end portion of a first ink tube 44*a* is connected to the connecting portion 43*b* (see also FIG. 5 for the first ink tube 44*a*). With this connection, the internal space of the ink hollow needle 43 and the flow channel formed by the first ink tube 44*a* form an integrated flow channel via the connecting portion 43*b*. Thus, it is possible to guide the ink from the ink cartridge 41 to the ink supply tube 44.

Note that the internal space of the ink hollow needle 43 is narrower than an internal space of the first ink tube 44*a* as illustrated in FIG. 4. Therefore, a lump (for example, solid gel) of a coloring component of the ink due to insufficient stirring of the ink, volatilization of a solvent component, or the like is easily clogged in the internal space of the ink hollow needle 43 and the vicinity thereof as compared with the other flow channels.

For example, FIG. 4 illustrates a first obstruction m1 clogged in the internal space of the ink hollow needle 43 and a second obstruction m2 clogged in the internal space of the first ink tube 44*a* in the vicinity of the ink hollow needle 43. Hereinafter, these are collectively and simply referred to as "obstructions", and reference sign "m" is added thereto. The obstructions m include a lump of solids, gel, and the like caused by sedimentation of the coloring component (pigment component) in the pigment ink, and a lump of solids caused by volatilization of the solvent. In addition, the obstructions m may include a solid and gel generated as components of the ink are modified. Regarding the modification of the components of the ink, for example, there is also a case where the ink may contain water due to moisture absorption from the atmosphere so that a precipitate insoluble in the solvent is generated.

The ink supply tube 44 constitutes a path for supplying the printing ink to the printing head 1. The ink can be circulated between the printing head 1 and the controller 100 by the path constituted by the ink supply tube 44.

In addition, as described later, the ink supply tube 44 is provided with a plurality of on-off valves including a first valve V1 and a plurality of pumps including a first pump P1. Among these, each of the on-off valves is configured using a solenoid valve. Each of the on-off valve is opened and closed in response to a control signal output from the control section 101, and can control the flow of the ink. On the other hand, each of the pumps receives a control signal output from the control section 101 to pressure-feed the ink, and can control the flow of the ink similarly to the on-off valve. Note that at least a part of opening and closing (for example, the first valve V1, an eighth valve V8, an eleventh valve V11, and an eighteenth valve V18 in FIG. 5) may be a manual cock instead of the solenoid valve.

(Solvent Supply Section 105)

The solvent supply section 105 supplies the solvent from the solvent cartridge 51 to the ink tank 106 similarly to the ink, or supplies the solvent alone to the nozzle 12. The former solvent forms the printing ink together with the ink by adjusting the concentration of the ink, and the printing ink is supplied to the printing head 1.

Here, when forming the printing ink together with the ink (that is, when being printed on the printing head 1), the solvent from the solvent supply section 105 is guided to the nozzle 12 through the ink tank 106. On the other hand, when being supplied as the solvent alone (that is, when cleaning the nozzle 12), the solvent from the solvent supply section 105 is guided to the nozzle 12 without passing through the ink tank 106.

Specifically, the solvent supply section 105 according to the present embodiment includes, as main constituent elements, the above-described solvent cartridge 51 and solvent reservoir 52, a solvent hollow needle 53, and a solvent supply tube 54. The solvent hollow needle 53 fluidly connects the solvent cartridge 51 and the solvent supply tube 54. The solvent supply tube 54 fluidly connects the solvent cartridge 51 to the printing head 1 and the solvent cartridge 51 to the ink tank 106 via the solvent hollow needle 53.

The solvent is contained in the solvent cartridge 51 among them. The solvent reservoir 52 detachably receives the solvent cartridge 51. It is possible to replenish the solvent for concentration adjustment and the solvent for cleaning by replacing the solvent cartridge 51 with respect to the solvent reservoir 52. That is, the ink jet printer I according to the present embodiment is also configured as a "cartridge" ink jet printer for the solvent.

Note that the solvent reservoir 52 is provided with a second mounting sensor SW2 that detects mounting of the solvent cartridge 51 or the ink cartridge 41 to the solvent reservoir 52 as illustrated only in FIG. 5.

The solvent hollow needle 53 accesses the solvent in the solvent cartridge 51 when the solvent reservoir 52 receives the solvent cartridge 51 (when the solvent cartridge 51 is attached to the solvent reservoir 52).

The solvent supply tube 54 constitutes a path for supplying the solvent to the ink tank 106 or a path for supplying the solvent to the printing head 1 without the intervention of the ink tank 106. Through these paths, the printing ink can be generated from the ink and the solvent, and the printing head 1 can be cleaned with the solvent.

Note that classifications of the ink supply tube 44 and the solvent supply tube 54 are merely classifications for convenience made to simplify the description. The ink supply tube 44 and the solvent supply tube 54 are substantially inseparable since the both are connected to each other or one serves as the other.

As described later, the solvent supply tube 54 is provided with a plurality of on-off valves including a twelfth valve V12 and a plurality of pumps including a second pump P2. Among these, each of the on-off valves is configured using a solenoid valve. Each of the on-off valve is opened and closed in response to a control signal output from the control section 101, and can control the flow of the solvent. On the other hand, each of the pumps receives a control signal output from the control section 101 to pressure-feed the solvent, and can control the flow of the solvent similarly to the solenoid valve. Note that a manual cock may be used instead of the solenoid valve as described above.

(Ink Tank 106)

The ink tank 106 is configured to store the ink from the ink cartridge 41 and the solvent from the solvent cartridge 51. Specifically, the ink tank 106 is configured using a container that contains the ink whose concentration (viscosity) has been adjusted by the solvent, that is, the mixture of the ink and the solvent.

The printing ink supplied from the ink tank 106 to the nozzle 12 lands on the surface of the printing target W at the time of printing, and is collected by the gutter 16 and sent back to the ink tank 106 at the time of non-printing. This achieves circulation of the printing ink.

In addition, the solvent supplied to the nozzle 12 for cleaning is also collected by the gutter 16, and then fed to the ink tank 106 through, for example, a conditioning tank (not illustrated) dedicated to the solvent, and can be reused for adjustment of the concentration of the ink.

In addition, the ink tank 106 is provided with a storage sensor 106*a* configured to detect a liquid level (so-called liquid surface level) in the tank. The storage sensor 106*a* is electrically connected to the control section 101, and inputs a detection signal thereof to the controller 100. The storage sensor 106*a* may be an electrode level sensor, a float level sensor, or a capacitance level sensor.

(Power Supply Section 121)

The power supply section 121 is interposed between a commercial power supply 700 and the control section 101, and can relay power supplied from the commercial power supply 700 and supply the power to the control section 101.

(Other Constituent Elements)

The controller 100 is provided with a connection cable 107 in which a power supply wire for transmitting and receiving a control signal, a tube (specifically, a tube constituting the ink supply tube 44) for transmitting and receiving the ink, and a tube (specifically, a tube constituting the solvent supply tube 54) for transmitting and receiving the solvent are covered in a bundle. This connection cable 107 is flexible and is connected to an upper end portion of the printing head 1 (see FIG. 1). The controller 100 and the printing head 1 are electrically and fluidly connected through this connection cable 107.

<Printing Head 1>

The printing head 1 ejects, as a particulate ink droplet, the ink (printing ink) whose concentration has been adjusted based on the control signal supplied from the controller 100, the ink, and the solvent. The printing head 1 can perform printing on the printing target W by deflecting a flying direction of the ejected ink droplet and causing the deflected ink droplet to land on the surface of the printing target W. Details of the printing at that time are in accordance with the above-described printing settings. The printing head 1 can sequentially perform printing on each of the printing targets W according to the printing settings.

Specifically, as illustrated in FIG. 3, the printing head 1 according to the present embodiment includes: a vibrator 11 that vibrates the printing ink; the nozzle 12 that ejects the printing ink vibrated by the vibrator 11; the charging electrode 13 that charges the particulate printing ink ejected from the nozzle 12; a charging detection sensor 14 that monitors a charging state of the printing ink; the deflection electrode 15 that deflects the flying direction of the printing ink charged by the charging electrode 13; and the gutter 16 that recovers the printing ink that is undeflected by the deflection electrode 15 or the solvent ejected from the nozzle 12.

The printing head 1 includes a housing 10 that accommodates the vibrator 11, the nozzle 12, the charging electrode 13, the charging detection sensor 14, the deflection electrode 15, and the gutter 16 therein and defines a flying space S1 of the ink droplets. The printing head 1 can eject the ink droplets deflected by the deflection electrode 15 to the outside of the housing 10 via the flying space S1.

An ejection port A for ejecting the ink droplets deflected by the deflection electrode 15 to the outside is opened on a lower surface of the housing 10 forming the outer shape of the printing head 1 (see FIG. 3). The ink droplets are ejected from the ejection port A toward the lower side of the housing 10.

As illustrated in FIG. 1, the printing head 1 at the time of printing is supported by, for example, the support member 2. The printing head 1 in a state of being supported by the support member 2 is arranged such that the ejection port A opposes a printing surface of the printing target W from above. This place is an example of an installation place of the printing head 1 when printing is performed by the ink jet printer I.

Hereinafter, the respective sections constituting the printing head 1 will be described in order. Note that an "up-down direction" in the following description refers to a direction along the vertical direction. For example, the upper side of the paper surface of FIG. 3 corresponds to an "upward direction", and the lower side of the ground in FIG. 3 corresponds to a "downward direction".

(Vibrator 11)

As illustrated in FIG. 3, the vibrator 11 is arranged near an upper end of the housing 10 in the flying space S1. The vibrator 11 according to the present embodiment incorporates a device (for example, a piezoelectric element) configured to apply (vibrate) vertical vibration to the printing ink. The vibrator 11 is configured to be supplied with the printing ink through the connection cable 107, and can vibrate the supplied printing ink. The printing ink vibrated by the vibrator 11 is supplied to the nozzle 12.

Note that the vibrator 11 according to the present embodiment is grounded although not illustrated.

(Nozzle 12)

As illustrated in FIG. 3, the nozzle 12 is connected to a lower end portion of the vibrator 11, and is arranged in a posture with an opening end (printing ink jetting opening) thereof being directed downward. The printing ink vibrated by the vibrator 11 can be ejected from the opening end of the nozzle 12. For example, a suction path 47 illustrated in FIG. 5 is connected to the nozzle 12 as a return path for releasing the pressure inside the printing head 1 at the time of starting the ink jet printer I (see FIG. 5). The solvent can also be sucked from the nozzle 12 through the suction path 47.

Here, the printing ink ejected from the nozzle 12 without being vibrated by the vibrator 11 flows in a so-called "ink axis" having an axis shape. On the other hand, the vibrated printing ink is granulated immediately after being ejected from the nozzle 12 to be so-called "ink droplets". The printing ink ejected from the nozzle 12 is axial immediately after being ejected from the nozzle 12 but changes to be particulate as moving further away from the nozzle 12. A position where the printing ink changes to be particulate is called breakpoint. The printing ink (ink droplet) ejected from the nozzle 12 passes through the charging electrode 13 to be described later.

Note that the solvent supplied to clean the printing head 1 passes through the vibrator 11 and the nozzle 12 in order and is ejected from the distal end portion of the nozzle 12. The solvent thus ejected flows axially and passes through the charging electrode 13.

(Charging Electrode 13)

As illustrated in FIG. 3, the charging electrode 13 is constituted by a pair of conductive metal plates, and is arranged on the lower side of the nozzle 12. Here, the pair of metal plates constituting the charging electrode 13 is fixed to the housing 10 in a posture with longitudinal directions thereof along the up-down direction and in a posture of facing each other in the horizontal direction. A gap between the pair of metal plates is set to be larger than a diameter of the ink droplet ejected from the nozzle 12, and the printing ink ejected from the nozzle 12 passes between the pair of metal plates. Note that the metal plates constituting the charging electrode 13 are not necessarily provided in a pair.

A potential (positive potential) is applied to the charging electrode 13 according to the present embodiment at least when a printing operation is executed. As a result, a potential difference is generated between the vibrator 11 and the charging electrode 13, and the ink droplets passing through the charging electrode 13 can be charged. In order to charge the respective ink droplets, the charging electrode 13 according to the present embodiment is arranged near the breakpoint where the printing ink ejected from the nozzle 12 change to be particulate.

A pulse potential that can be controlled by the controller 100 is applied to the charging electrode 13. Here, in a case where a relatively high voltage is applied to the charging electrode 13, a changing amount (a magnitude of negative charge) of each of the ink droplets becomes larger than that in a case where a lower voltage is applied. In a case where the changing amount of each of the ink droplets is large, the ink droplet is greatly deflected by the deflection electrode 15 as compared with a case where the charging amount is small. The controller 100 can control a deflection amount of the ink droplet by adjusting a magnitude of the pulse potential. The ink droplets charged by the charging electrode 13 reach the deflection electrode 15 that has passed through the side of the charging detection sensor 14.

In addition, the solvent ejected from the nozzle 12 passes through the side of the charging detection sensor 14 and reaches the deflection electrode 15 without being charged.

(Charging Detection Sensor 14)

As illustrated in FIG. 3, the charging detection sensor 14 is arranged on the lower side of the charging electrode 13. Specifically, the charging detection sensor 14 is arranged on the lower side of the metal plate (the metal plate on the right side of the paper surface in the example illustrated in FIG. 3) constituting the charging electrode 13 so as not to cross a trajectory when the ink droplet flies. Since the charging detection sensor 14 is arranged in this manner, it is possible to avoid a collision between the ink droplet and the charging detection sensor 14.

In addition, the charging detection sensor 14 according to the present embodiment is connected to a circuit board provided inside the housing 10. The charging detection sensor 14 can detect the charging state of the ink droplet passing through the side thereof. A detection result obtained by the charging detection sensor 14 is output to the control section 101 as a detection signal. Based on this detection signal, the control section 101 can determine whether or not each of the ink droplets is appropriately charged.

(Deflection Electrode 15)

As illustrated in FIG. 3, the deflection electrode 15 is constituted by a pair of conductive metal plates (so-called “counter electrodes”), and is arranged on the lower side of the charging electrode 13 and the charging detection sensor 14. Here, the pair of metal plates is fixed to the housing 10 in a posture with longitudinal directions thereof substantially along the up-down direction and in a posture of facing each other in the horizontal direction. The ink droplets that have passed between the pair of metal plates constituting the charging electrode 13 pass between the pair of metal plates constituting the deflection electrode 15.

A voltage that can be controlled by the controller 100 is applied to the deflection electrode 15. As a result, a potential difference is generated between the pair of metal plates constituting the deflection electrode 15. Due to this potential difference, a flying direction of the ink droplet can be deflected according to a charging amount of the ink droplet. The flying direction of the ink droplet can be deflected along an array direction of the pair of metal plates constituting the deflection electrode 15.

That is, the flying direction of the ink droplet can be controlled via the voltage applied to each of the charging electrode 13 and the deflection electrode 15. The ink droplets whose flying direction is controlled in this manner include one deflected by the deflection electrode 15 and one not deflected by the deflection electrode 15 (undeflected one). Among them, the ink droplet deflected by the deflection electrode 15 is involved in printing of the printing target W. The ink droplet deflected by the deflection electrode 15 is ejected from the ejection port A provided on the lower surface of the housing 10 and land on the printing target W.

On the other hand, the ink droplet that is undeflected by the deflection electrode 15 is not involved in the printing of the printing target W. Such an ink droplet or the axis-shaped printing ink that has not changed to be particulate in the first place reach the inside of the gutter 16 as exemplified by the chain lines in FIG. 3. Similarly, the solvent used for cleaning the nozzle 12 and the like in the printing head 1 and having passed through the deflection electrode 15 also reaches the inside of the gutter 16.

(Gutter 16)

As exemplified in FIG. 3, the gutter 16 is configured using a curved tube having an opening 16*a* facing upward, and is arranged on the lower side of the deflection electrode 15. The gutter 16 according to the present embodiment can recover the printing ink that is not involved in printing of the printing target W and the solvent (specifically, the solvent ejected from the nozzle 12) that has passed through the nozzle 12.

Specifically, in the present embodiment, the opening 16*a* of the gutter 16 and the opening end of the nozzle 12 are arranged to face each other, and the opening end of the nozzle 12 is located directly above the opening 16*a* of the gutter 16. With this arrangement, a fluid flowing along the vertical direction from the opening end of the nozzle 12, that is, the flying fluid can be received from the opening 16*a* of the gutter 16.

The gutter 16 is provided with a gutter sensor 16*b* of a charge type or a thermistor type (see FIG. 3). The gutter sensor 16*b* can detect whether or not the printing ink is present in the gutter 16, determine that adjustment of the ink axis is completed if the printing ink is in the gutter 16, and determine that the adjustment of the ink axis is not completed if the printing ink is not present in the gutter 16. The gutter sensor 16*b* is connected to the control section 101 of the controller 100, and is configured to output a signal to the control section 101.

The printing ink or solvent recovered by the gutter 16 is sent back to the controller 100 through the ink supply tube 44, the solvent supply tube 54, and the like to be stored in the ink tank 106.

Hereinafter, configurations of the ink supply tube 44 and the solvent supply tube 55 will be described with reference to FIG. 4 in order to describe flows of the ink, the solvent, and the printing ink in detail.

<Regarding Flowing Path of Ink and Solvent>

As described above, the ink supply tube 44 supplies the ink from the ink cartridge 41 to the ink tank 106, and supplies the printing ink from the ink tank 106 to the printing head 1. Meanwhile, the solvent supply tube 54 supplies the solvent from the solvent cartridge 51 to each of the printing head 1 and the ink tank 106.

—First Path R1—

The ink supply tube 44 constitutes, for example, a path (first path R1) for feeding the ink (ink before concentration adjustment) from the ink cartridge 41 to the ink tank 106.

As illustrated in FIG. 5, the first path R1 according to the present embodiment is constituted by the first ink tube 44*a* serving as the ink flowing tube, a second ink tube 44*b*, and a third ink tube 44*c*. Both the first ink tube 44*a*, the second ink tube 44*b*, and the third ink tube 44*c* are arranged inside the controller 100 in the present embodiment.

The first ink tube 44*a* has one end portion connected to the hollow needle 43 and the other end portion (see a branching portion B1 in FIG. 5) branching into the second ink tube 44*b* and the third ink tube 44*c*. The first ink tube 44*a* serving as the ink flowing tube connects the ink hollow needle 43 and the ink tank 106 with the second ink tube 44*b* and the third ink tube 44*c* interposed therebetween, and causes the ink to flow from the ink hollow needle 43 to the ink tank 106. Note that the ink is introduced into the ink tank 106 through the third ink tube 44*c* in the present embodiment, but may be introduced through, for example, the second ink tube 44*b*. In this case, the ink is introduced into the ink tank 106 without passing through a viscometer 46.

Note that classifications of the first ink tube 44*a*, the second ink tube 44*b*, and the third ink tube 44*c* are given merely for convenience. For example, the first ink tube 44*a* and the second ink tube 44*b* may be regarded as one ink flowing tube. In this case, the ink flowing tube constituted by the first ink tube 44*a* and the second ink tube 44*b* directly connects the ink hollow needle 43 and the ink tank 106.

In addition, the first pump P1 is arranged in the middle of the first ink tube 44*a*. The first pump P1 is a suction pump configured to perform suction so as to generate a flow from the ink hollow needle 43 toward the first ink tube 44*a*.

In addition, a joining section 45 is arranged in the first ink tube 44*a* between the ink hollow needle 43 and the first pump P1. The joining section 45 is configured to cause the solvent or the ink to join in the first ink tube 44*a*. In particular, the joining section 45 illustrated in FIG. 5 is connected to a third solvent tube 54*c* of the solvent supply tube 54, and is configured to cause the solvent and the solvent in the ink to join an ink flowing through the first ink tube 44*a*. In addition, the ink caused to join in the first ink tube 44*a* may be the printing ink.

In addition, the eighth valve V8 is arranged in the first ink tube 44*a* between the joining section 45 and the first pump P1. The eighth valve V8 is an on-off valve that opens and closes a flow channel of the first ink tube 44*a*.

The second ink tube 44*b* connects the other end portion (the branching portion B1) of the first ink tube 44*a* and the ink tank 106. The first valve V1 is arranged in the middle of the second ink tube 44*b*. The first valve V1 is an on-off valve that opens and closes the flow channel of the second ink tube 44*b*.

The third ink tube 44*c* connects the other end portion (the branching portion B1) of the first ink tube 44*a* and the ink tank 106. The eleventh valve V11 is arranged in the middle of the third ink tube 44*c*. The eleventh valve V11 is an on-off valve that opens and closes the flow channel of the third ink tube 44*c*.

In addition, the viscometer 46 is arranged in the third ink tube 44*c* between the eleventh valve V11 and the ink tank 106. The viscometer 46 detects a flow rate of the ink or the printing ink flowing through the third ink tube 44*c*, and measures the viscosity based on the flow rate. The viscometer 46 inputs a detection signal corresponding to a result of the measurement to the control section 101. Note that the viscometer 46 based on the principle of detecting the flow rate of the ink is used in the present embodiment, but the invention is not limited thereto. For example, the viscometer 46 that repeats filling and discharging of the ink and measures the viscosity based on a time during which the ink is discharged may be used.

The ink from the ink cartridge 41 passes through the ink hollow needle 43, the ink reservoir 42, the first ink tube 44*a*, the second ink tube 44*b*, and the third ink tube 44*c* in order based on an operating status of the first pump P1 and opening/closing statuses of the first valve V1, a fifth valve V5, and the eighth valve V8, and is supplied to the ink tank 106.

The control (suction control) related to the supply to the ink tank 106 will be described later.

—Second Path R2—

Meanwhile, the solvent supply tube 54 constitutes a path (second path R2) for feeding the solvent from the solvent cartridge 51 to the ink tank 106 together with some elements of the ink supply tube 44.

As illustrated in FIG. 5, the second path R2 according to the present embodiment is constituted by a first solvent tube 54*a* of the solvent supply tube 54, a part of the first ink tube 44*a* (a portion from a connecting portion B2 to the branching portion B1 in FIG. 5), the entire second ink tube 44*b*, and the entire third ink tube 44*c*. In the present embodiment, the first solvent tube 54*a* is arranged in the controller 100.

As described above, names of the ink supply tube 44 and the solvent supply tube 54 are given focusing on a side surface of a part of each flowing tube, and are given merely for convenience. As in the first ink tube 44*a*, the second ink tube 44*b*, and the third ink tube 44*c*, flowing of the ink and flowing of the solvent may be achieved together. Each flowing tube may contribute to the configuration of one or more paths.

The first solvent tube 54*a* has one end portion connected to the ink hollow needle 43 and the other end portion (the connecting portion B2) connected to the first ink tube 44*a*. A thirteenth valve V13 is arranged in the middle of the first solvent tube 54*a* in the solvent supply tube 54. The thirteenth valve V13 is an on-off valve that opens and closes a flow channel of the first solvent tube 54*a*.

The solvent from the solvent cartridge 51 passes through the solvent hollow needle 53, the solvent reservoir 52, and the first solvent tube 54*a* in order and is supplied to a site in the middle of the first ink tube 44*a* (see the connecting portion B2 in FIG. 5) according to the operating status of the first pump P1 and an opening/closing status of the thirteenth valve V13. The solvent supplied to this site passes through the first ink tube 44*a*, the second ink tube 44*b*, and the third ink tube 44*c* in order and is supplied to the ink tank 106 according to the opening/closing statuses of the first valve V1 and the eleventh valve V11.

The concentration of the ink supplied through the first path R1 is adjusted by the solvent supplied through the second path R2. As a result, the printing ink is stored in the ink tank 106.

—Third Path R3—

Returning to the description of the ink supply tube 44, the ink supply tube 44 also constitutes a path (third path R3) for circulating and stirring a stored object (the printing ink) in the ink tank 106 in the controller 100.

As illustrated in FIG. 5, the third path R3 according to the present embodiment is constituted by a fourth ink tube 44*d* and a fifth ink tube 44*e* of the ink supply tube 44, a part of the first ink tube 44*a* (a portion from the connecting portion B2 to the branching portion B1 in FIG. 5), the entire second ink tube 44*b*, and the entire third ink tube 44*c*. Both the fourth ink tube 44*d* and the fifth ink tube 44*e* are arranged inside the controller 100 in the present embodiment.

The fourth ink tube 44*d* has one end portion connected to the ink tank 106 and the other end portion (the connecting portion B2) connected to the first ink tube 44*a*. A ninth valve V9 is arranged in the middle of the fourth ink tube 44*d*. The ninth valve V9 is an on-off valve that opens and closes a flow channel of the fourth ink tube 44*d*.

The fifth ink tube 44*e* has one end portion connected to the ink tank 106 and the other end portion (the connecting portion B2) connected to the first ink tube 44*a*. The fifth valve V5 is arranged in the middle of the fifth ink tube 44*e*. The fifth valve V5 is an on-off valve that opens and closes a flow channel of the fifth ink tube 44*e*.

Note that a connection position between the fourth ink tube 44*d* and the ink tank 106 (a position where the printing ink is sucked by the fourth ink tube 44*d*) is arranged to be higher than a connection position between the fifth ink tube 44*e* and the ink tank 106 (a position where the printing ink is sucked by the fifth ink tube 44*e*) in the height direction of the ink tank 106.

Based on the operating status of the first pump P1 and the opening/closing statuses of the first valve V1, the fifth valve V5, the ninth valve V9, and the eleventh valve V11, the printing ink in the ink tank 106 is sucked out by the fourth ink tube 44*d* or the fifth ink tube 44*e*, and then, passes through a part of the first ink tube 44*a* (a portion from the connecting portion B2 to the branching portion B1 in FIG. 5), the second ink tube 44*b*, the third ink tube 44*c* in order to be fed back to the ink tank 106. As a result, the printing ink circulates in the controller 100.

In addition, the printing ink can be not only caused to simply circulate in the controller 100 but also stirred in the ink tank 106 with the configuration in which the printing ink is sucked from two locations having different heights. As a result, the printing ink can be kept in a liquid state. This configuration is particularly effective in a case where the pigment ink is used for the ink.

—Fourth Path R4—

The ink supply tube 44 further forms a path (fourth path R4) for feeding the printing ink from the ink tank 106 to the nozzle 12 and feeding back the printing ink from the gutter 16 to the ink tank 106.

As illustrated in FIG. 5, the fourth path R4 according to the present embodiment is constituted by a sixth ink tube 44*f* and a seventh ink tube 44*g* of the ink supply tube 44. Both the sixth ink tube 44*f* and the seventh ink tube 44*g* connect the controller 100 and the printing head 1.

The sixth ink tube 44*f* has one end portion connected to the ink tank 106 and the other end portion connected to the nozzle 12. A third pump P3 is arranged in the middle of the sixth ink tube 44*f*. The third pump P3 is a suction pump configured to perform suction so as to generate a flow from the ink tank 106 toward the sixth ink tube 44*f*.

In addition, a fourteenth valve V14 is arranged in the sixth ink tube 44*f* between the third pump P3 and the nozzle 12. The fourteenth valve V14 is an on-off valve that opens and closes a flow channel of the sixth ink tube 44*f*.

The seventh ink tube 44*g* has one end portion connected to the gutter 16 and the other end portion connected to the ink tank 106. A fourth pump P4 is arranged in the middle of the seventh ink tube 44*g*. The fourth pump P4 is a suction pump configured to perform suction so as to generate a flow from the gutter 16 toward the seventh ink tube 44*g*.

In addition, a tenth valve V10 is arranged in the seventh ink tube 44*g* between the gutter 16 and the fourth pump P4. The tenth valve V10 is an on-off valve that opens and closes a flow channel of the seventh ink tube 44*g*.

The printing ink in the ink tank 106 is sucked out by the sixth ink tube 44*f* and ejected from the nozzle 12 according to an operating status of the third pump P3 and an opening/closing status of the fourteenth valve V14. The printing ink ejected from the nozzle 12 lands on the surface of the printing target W at the time of printing, and is recovered by the gutter 16 at the time of non-printing. The printing ink of the latter is sucked out by the seventh ink tube 44*g* and fed back to the ink tank 106 according to the operating status of the fourth pump P4 and an opening/closing status of the tenth valve V10. As a result, the printing ink circulates between the controller 100 and the printing head 1.

—Fifth Path R5—

Meanwhile, the solvent supply tube 54 constitutes a path (fifth path R5) for feeding the solvent for cleaning from the solvent cartridge 51 to the nozzle 12 together with some elements of the ink supply tube 44.

As illustrated in FIG. 5, the fifth path R5 according to the present embodiment is constituted by a part of the first solvent tube 54*a* (an upstream end portion including a connecting portion with the solvent hollow needle 53), a second solvent tube 54*b* in the solvent supply tube 54, and a part of the sixth ink tube 44*f* (a downstream end portion including a connecting portion with the nozzle 12). The second solvent tube 54*b* connects the controller 100 and the printing head 1.

The second solvent tube 54*b* has one end portion connected to the first solvent tube 54*a* between the solvent hollow needle 53 and the thirteenth valve V13, and the other end portion connected to the sixth ink tube 44*f* between the fourteenth valve V14 and the nozzle 12. The second pump P2 is arranged in the middle of the second solvent tube 54*b* in the solvent supply tube 54. The second pump P2 is a suction pump configured to perform suction so as to generate a flow from the solvent hollow needle 53 toward the solvent supply tube 54 (particularly, the second solvent tube 54*b*).

In addition, the twelfth valve V12 is arranged in the second solvent tube 54*b* between the second pump P2 and the nozzle 12. The twelfth valve V12 is an on-off valve that opens and closes a flow channel of the second solvent tube 54*b* in the solvent supply tube 54.

The solvent from the solvent cartridge 51 passes through the solvent hollow needle 53, the solvent reservoir 52, the first solvent tube 54*a*, and the second solvent tube 54*b* in order and is supplied to a site in the middle of the sixth ink tube 44*f* (a site between the fourteenth valve V14 and the nozzle 12) according to an operating status of the second pump P2 and an opening/closing status of the twelfth valve V12. The solvent supplied to this site is ejected from the nozzle 12. This solvent cleans the printing head 1.

—Sixth Path R6—

The solvent supply tube 54 further constitutes a path (sixth path R6) for feeding the solvent from the solvent cartridge 51 to the ink supply tube 44 and the ink hollow needle 43 via the joining section 45.

As illustrated in FIG. 5, the sixth path R6 according to the present embodiment is constituted by a part of the first solvent tube 54*a*, a part of the second solvent tube 54*b*, and the third solvent tube 54*c* in the solvent supply tube 54. Note that the "part of the first solvent tube 54*a*" herein refers to a portion from the solvent hollow needle 53 to a connecting portion B3 with the first solvent tube 54*a* and the second solvent tube 54*b*. The "part of the second solvent tube 54*b*" herein refers to a portion from the connecting portion B3 with the first solvent tube 54*a* and the second solvent tube 54*b* to a position between the second pump P2 and the twelfth valve V12 (see a connecting portion B4 in FIG. 5). The sixth path R6 branches from the fifth path R5 on the downstream side of the second pump P2. The third solvent tube 54*c* is arranged in the controller 100 in the present embodiment.

The third solvent tube 54*c* has one end portion connected to the second solvent tube 54*b* between the second pump P2 and the twelfth valve V12, and the other end portion connected to the joining section 45.

The third solvent tube 54*c* constitutes a "solvent flowing tube" in the present embodiment together with the part of the first solvent tube 54*a* and the part of the second solvent tube 54*b*. When the solvent reservoir 52 receives the solvent cartridge 51, the third solvent tube 54*c* causes the solvent in the solvent cartridge 51 to flow to the joining section 45 via the first solvent tube 54*a* and the second solvent tube 54*b*.

Here, the second pump P2 is arranged in the middle of the second solvent tube 54*b* constituting the solvent flowing tube. The second pump P2 can also be considered as a solvent pump that operates to generate a flow from the second solvent tube 54*b* toward the ink hollow needle 43 via the joining section 45 and the first ink tube 44*a*.

In addition, the eighteenth valve V18 is arranged in the second solvent tube 54*b* between the joining section 45 and the second pump P2. The eighteenth valve V18 is a second on-off valve that opens and closes the flow channel of the second solvent tube 54*b*.

A flow of the ink or the solvent related to the sixth path R6 will be described later.

—Path Related to Suction of Ink—

The controller 100 also has a path related to suction of ink. For example, the controller 100 has the suction path 47 connected to the nozzle 12. The suction path 47 is provided with a sixth valve V6. For example, when the first pump P1 is operated in a state where the sixth valve V6 is open at the time of non-printing, the ink can be sucked through the suction path 47, and the sucked ink can be sent back to the controller 100.

<Suction Control of Ink>

—Basic Concept of Suction Control—

Among the first path R1 to the sixth path R6 described above, the first path R1 is related to supply of ink to the ink tank 106. The supply of ink is controlled by the supply control section 101*a* described above. The supply control section 101*a* supplies the ink to the ink tank 106 by executing predetermined suction control.

Specifically, when the ink is taken out from the ink cartridge 41 received in the ink reservoir 42, the supply control section 101*a* according to the present embodiment executes the suction control so as to generate a flow from the ink hollow needle 43 serving as the hollow needle toward the first ink tube 44*a* serving as the ink flowing tube.

Here, "generating the flow from the ink hollow needle 43 toward the first ink tube 44*a*" is equivalent to controlling at least a part (for example, an upstream end portion) of the first ink tube 44*a* to have a negative pressure as compared with the outside of the ink hollow needle 43 or an internal space of the ink cartridge 41.

Specifically, when the ink is taken out from the ink cartridge 41 received in the ink reservoir 42, the supply control section 101*a* executes the suction control by bringing the eighth valve V8 serving as the on-off valve into an open state and operating the first pump P1 serving as the suction pump. The first pump P1 is operated after the eighth valve V8 is brought into the open state, which is advantageous in generating the negative pressure as described above. Note that the on-off valves such as the first valve V1 and the eleventh valve V11 may also be brought into open states in the suction control.

More specifically, when the ink is taken out from the ink cartridge 41 received by the ink reservoir 42, the supply control section 101*a* executes the suction control by bringing the eighth valve V8 into the open state, bringing the eighteenth valve V18 serving as the second on-off valve into a closed state, and operating the first pump P1. When the eighteenth valve V18 is brought into the closed state, it is possible to prevent suction of the solvent from the solvent cartridge 51.

—Specific Example of Suction Control—

Figure 6A:
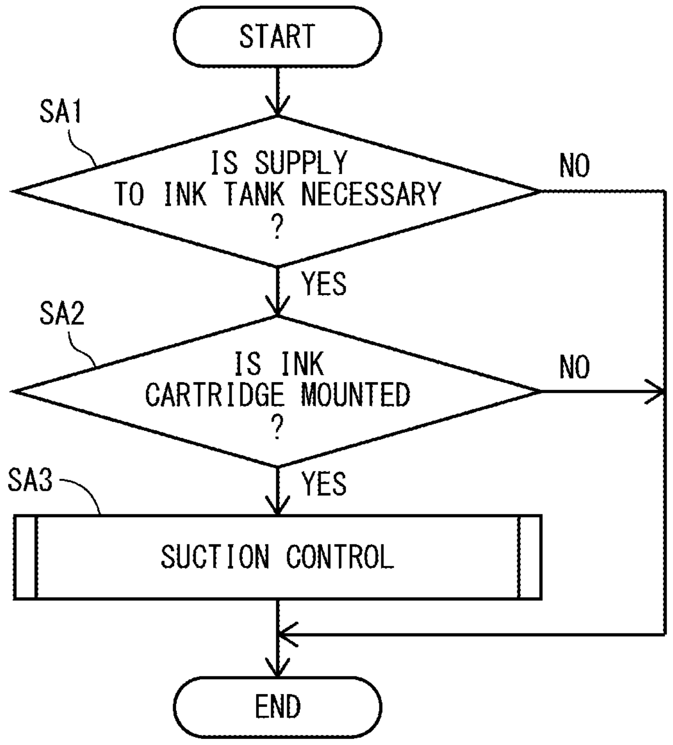
FIG. 6A is a flowchart illustrating an execution condition of suction control.
Figure 6B:
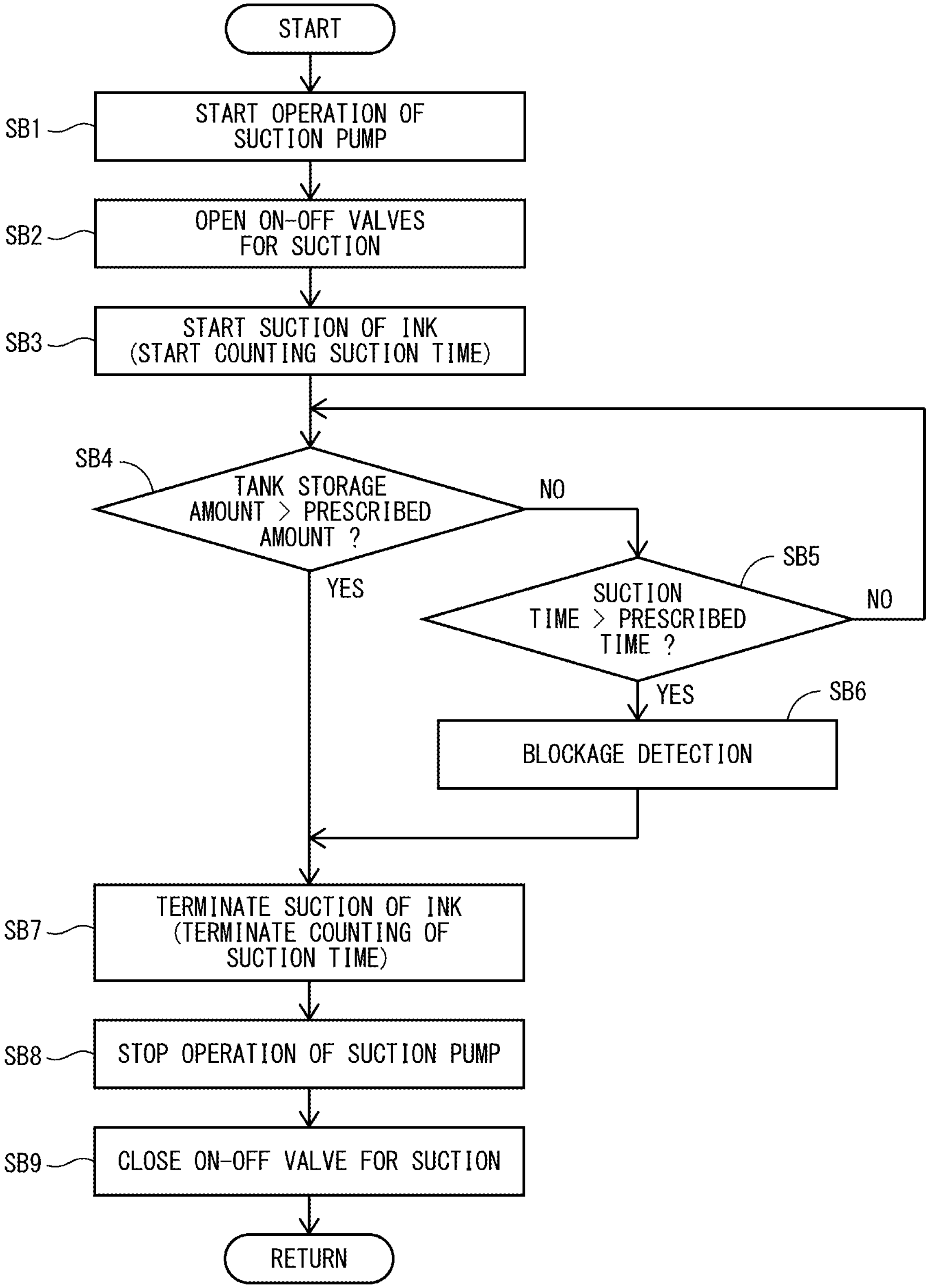
FIG. 6B is a flowchart illustrating a specific example of the suction control.
Figure 7A:
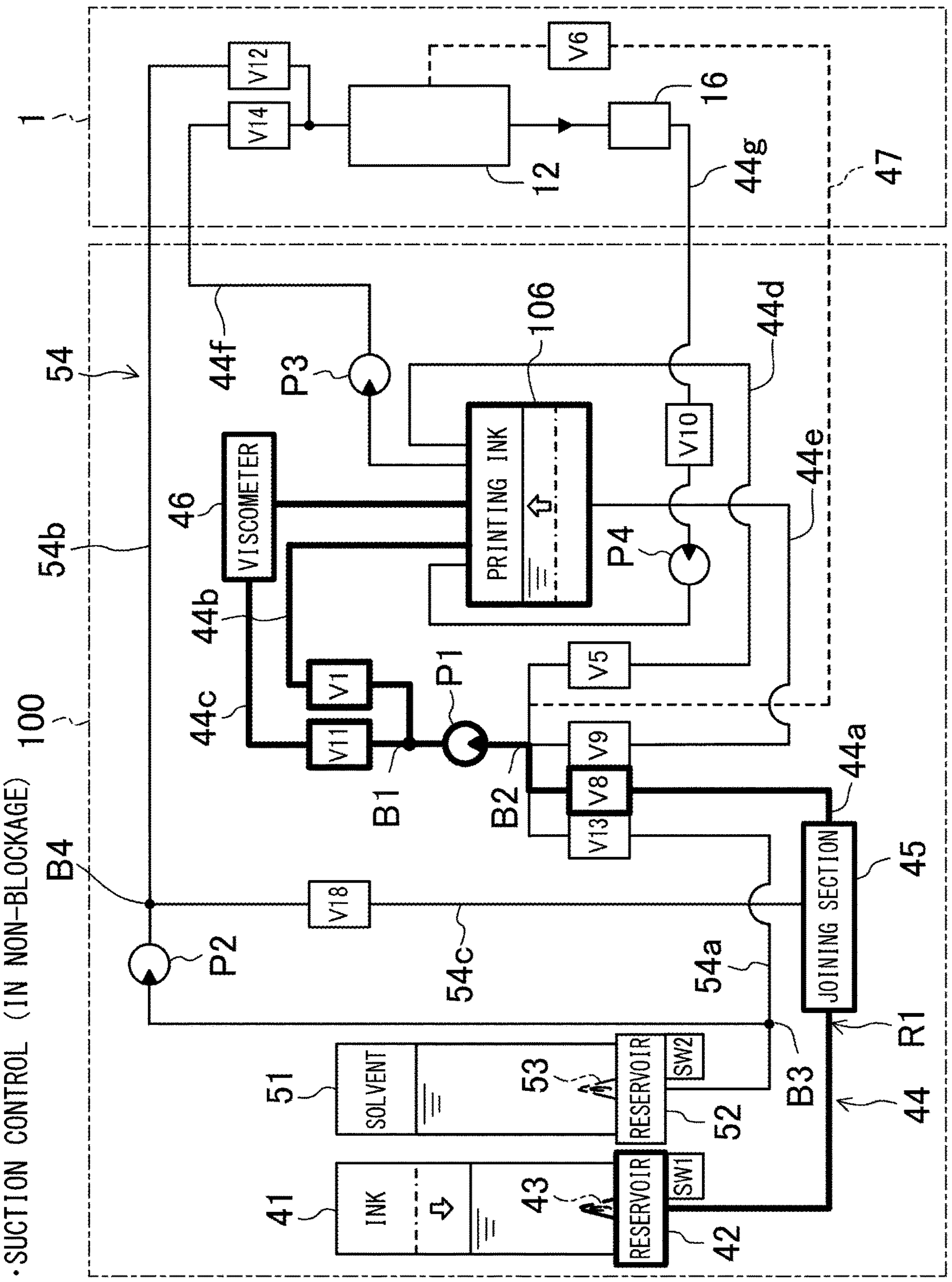
FIG. 7A is a diagram for describing a flow generated by the suction control when an ink flowing tube is not blocked.
Figure 7B:
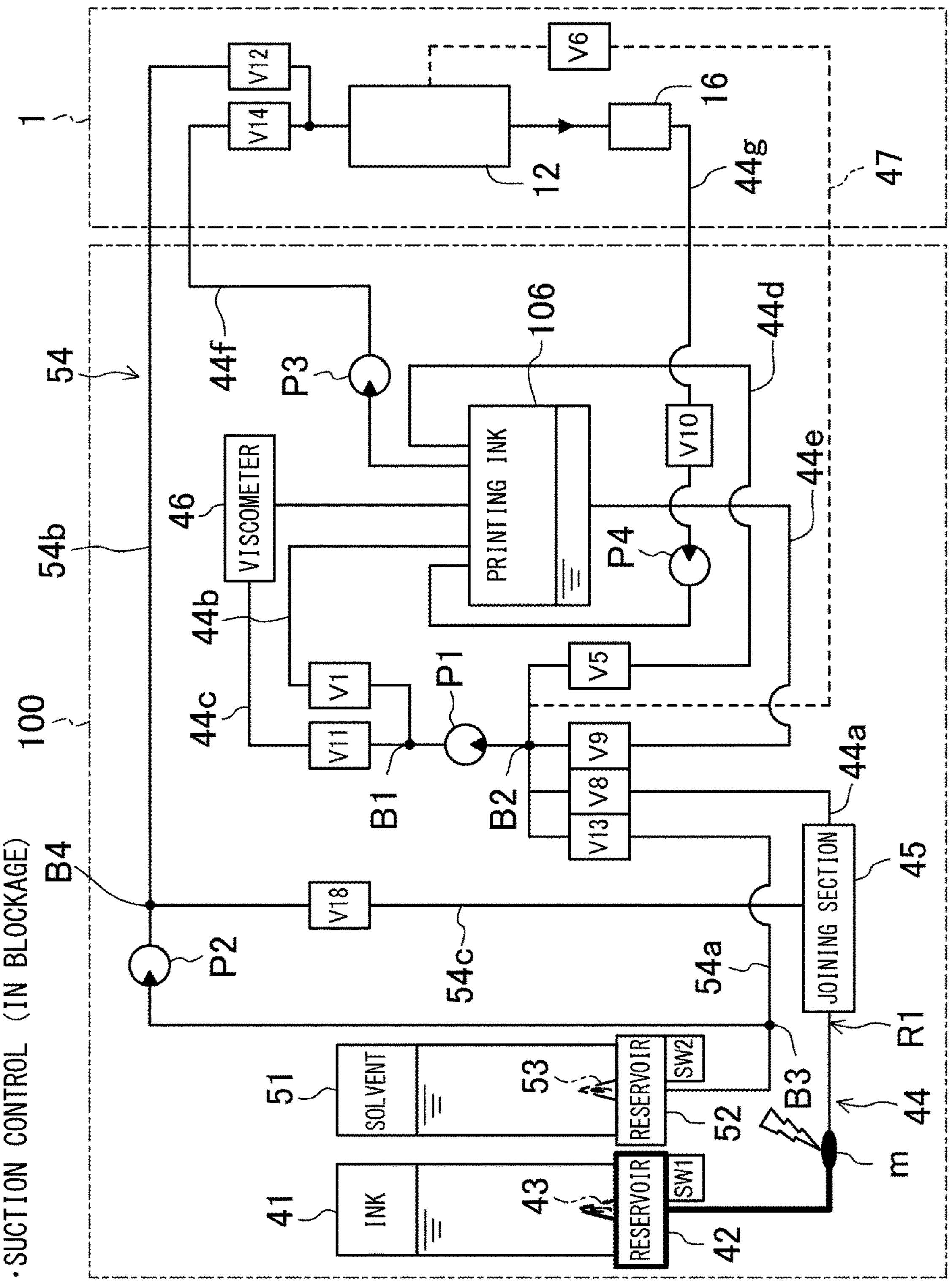
FIG. 7B is a diagram for describing a flow generated by the suction control when the ink flowing tube is blocked.

Hereinafter, a specific example of the suction control will be described with reference to FIGS. 6A and 6B and FIGS. 7A and 7B. Here, FIG. 6A is a flowchart illustrating an execution condition of the suction control. FIG. 6B is a flowchart illustrating a specific example of the suction control. FIG. 7A is a diagram for describing a flow generated by the suction control when the ink flowing tube is not blocked. FIG. 7B is a diagram for describing a flow generated by the suction control when the ink flowing tube is blocked.

First, in step SA1 of FIG. 6A, the supply control section 101*a* determines whether or not it is necessary to supply ink to the ink tank 106. This determination can be made based on, for example, a detection signal of the storage sensor 106*a*. If the determination is YES, the supply control section 101*a* advances a control process to step SA2. If this determination is NO, the supply control section 101*a* terminates the flow according to FIG. 6A.

Note that, for example, a liquid level of the ink tank 106 may be displayed on the display section 103*a* based on the detection signal of the storage sensor 106*a*, and a user may determine the necessity of the suction control based on a content of the display. In this case, step SA1 is unnecessary.

In subsequent step SA2, the supply control section 101*a* determines whether or not the ink cartridge 41 is mounted to the ink reservoir 42. This determination can be made based on, for example, a detection signal of the first mounting sensor SW1. If the determination is YES, the supply control section 101*a* advances the control process to step SA3. If this determination is NO, the supply control section 101*a* terminates the flow according to FIG. 6A.

In subsequent step SA3, the supply control section 101*a* executes the suction control. Details of the suction control are as illustrated in steps SB1 to SB9 of FIG. 6B. Note that it is assumed that all the on-off valves such as the first valve V1 are in closed states before step SB1 is started.

First, in step SB1 of FIG. 6B, the supply control section 101*a* operates the first pump P1 (starts the operation of the suction pump).

In subsequent step SB2, the supply control section 101*a* opens on-off valves for suction. The on-off valves opened in step SB2 include the eighth valve V8 and the first valve V1, and the eleventh valve V11 as necessary.

When the eighth valve V8, the first valve V1, and the eleventh valve V11 are brought into the open states, the first path R1 connecting the ink cartridge 41 and the ink tank 106 is constructed as indicated by the thick lines in FIG. 7A. When the first pump P1 is operated in this state, the suction of ink is started. The ink sucked from the ink cartridge 41 is supplied to the ink tank 106 through the first path R1. Note that it is not essential to bring the eleventh valve V11 into the open state.

Therefore, in subsequent step SB3, the supply control section 101*a* starts counting a suction time with the start of suction of ink. This counting can be performed by a timer (not illustrated) built in the control section 101.

In subsequent step SB4, the supply control section 101*a* determines whether or not a contained amount (tank storage amount) of ink in the ink tank 106 exceeds a prescribed amount set in advance. This determination can be made based on, for example, a detection signal of the storage sensor 106*a*. If the determination is YES, the supply control section 101*a* advances a control process to step SB7. If this determination is NO, the supply control section 101*a* advances the control process to step SB5.

In step SB5, the supply control section 101*a* determines whether or not the suction time exceeds a prescribed time set in advance. This determination can be made by the above-described timer. If the determination is YES, the supply control section 101*a* advances the control process to step SB6. In this case, the control process proceeds from step SB6 to step SB7. On the other hand, if the determination in step SB5 is NO, the supply control section 101*a* returns the control process to step SB4. When returning from step SB5 to step SB4, the supply control section 101*a* counts up the suction time.

That is, when the tank storage amount exceeds the prescribed amount, or when the suction time exceeds the prescribed time even though the tank storage amount does not exceed the prescribed amount, the supply control section 101*a* advances the control process to step SB7.

Here, a case where the control process proceeds to step SB6 corresponds to a case where the tank storage amount does not reach the prescribed amount even though the suction time exceeds the prescribed time. In this case, it can be determined that ink clogging has occurred in the middle of the first path R1, and eventually, blockage due to the ink clogging has occurred as illustrated in FIG. 6B. The storage sensor 106*a* functions as a detector that detects a blocked state in the ink hollow needle 43 and a blocked state in the first ink tube 44*a* between the ink hollow needle 43 and the joining section 45. Note that the ink supply tube 44 may be provided with a pressure gauge, and the detector may be configured using the pressure gauge. Alternatively, the detector may be configured using the viscometer 46. For example, when the blockage occurs in the middle of the first path R1, supply of ink is delayed, so that a printing ink having a viscosity higher than expected is generated. Whether or not the blockage has occurred can be determined based on this change in the viscosity. In addition, in the case of using the viscometer 46 configured to repeat filling and discharging of ink, a time for filling the viscometer 46 with the ink increases if the blockage occurs in the middle of the first path R1. In this case, whether or not the blockage has occurred can be determined based on a change in such a filling time.

As described with reference to FIG. 4, such blockage may occur in the internal space of the ink hollow needle 43 and in the vicinity thereof. Note that the "vicinity of the ink hollow needle 43" herein includes an upstream side portion (for example, a flow channel on the upstream side with respect to the joining section 45) of the first ink tube 44*a* directly connected to the ink hollow needle 43.

In step SB6, the supply control section 101*a* displays that the above-described blockage has been detected (blockage detection) to a user. Note that step SB6 is not essential. As described above, the user may determine the presence or absence of blockage based on a liquid level of the ink tank 106 displayed on the display section 103*a*. In this case, step SB6 is unnecessary.

Thereafter, in step SB7, the supply control section 101*a* terminates the counting of the suction time so as to terminate the suction of ink.

In subsequent step SB8, the supply control section 101*a* stops the operation of the first pump P1 operated in step SB1 (stop of operation of the suction pump). Thereafter, in step SB9, the supply control section 101*a* closes the on-off valves for suction opened in step SB2, such as the eighth valve V8 and the first valve V1. When step SB9 is completed, the supply control section 101*a* terminates the flow illustrated in FIGS. 6A and 6B.

<Blowing Control of Ink>

—Basic Concept of Blowing Control—

As illustrated in FIG. 7B, the internal space of the ink hollow needle 43 and the internal space of the first ink tube 44*a* in the vicinity of the ink hollow needle 43 may be blocked by the obstructions m at the time of suction control. The supply control section 101*a* is configured to eliminate such blockage by executing predetermined blowing control.

Specifically, when reverse-flow cleaning a flow path, the supply control section 101*a* according to the present embodiment executes the blowing control for generating a flow from the first ink tube 44*a* serving as the ink flowing tube toward the ink hollow needle 43 serving as the hollow needle.

Note that a "reverse flow" herein refers to a flow in a direction opposite to a flow direction in the suction control, that is, a flow in the opposite direction of the flow from the ink hollow needle 43 toward the first ink tube 44*a*.

In addition, "generating the flow from the first ink tube 44*a* toward the ink hollow needle 43" is equivalent to controlling at least a part (for example, the upstream end portion) of the first ink tube 44*a* to have a positive pressure as compared with the outside of the ink hollow needle 43 or the internal space of the ink cartridge 41 or the solvent cartridge 51 attached to the ink reservoir 42.

Pressure (in particular, the above-described positive pressure) is applied to the ink hollow needle 43 by such a flow in the opposite direction. This pressure pushes out the obstructions in clogged in the internal space of the ink hollow needle 43 and the internal space of the first ink tube 44*a* in the vicinity of the ink hollow needle 43 in the opposite direction. As a result, the obstructions m can be discharged into the ink cartridge 41 currently accessed by the ink hollow needle 43. Note that as a discharge destination of the obstructions m, the ink cartridge 41 that is empty may be used, the ink cartridge 41 containing ink may be used, or the empty solvent cartridge 51 that is empty and contains no solvent may be used.

In a case where the empty ink cartridge 41 is used, there is more room in the content amount than that in the case of using the ink cartridge 41 containing ink, and thus, the blowing control can be performed for a longer time.

On the other hand, in a case where the ink cartridge 41 containing ink is used, time and effort for replacing the ink cartridge 41 can be saved. When the solvent is made to flow reversely as will be described later, the concentration in the ink cartridge 41 changes, but the concentration is adjusted in the ink tank 106 before printing, and thus, the influence on the printing can be minimized.

In other words, the supply control section 101*a* supplies the solvent or the ink to the ink hollow needle 43 through the joining section 45 in a state where the flow channel of the first ink tube 44*a* is closed by the eighth valve V8 serving as the on-off valve. That is, when the reverse-flow cleaning is performed on the flow path, the supply control section 101*a* executes the blowing control by bringing the eighth valve V8 serving as the on-off valve into the closed state and supplying the solvent or the ink through the joining section 45. When the eighth valve V8 is brought into the open state and the solvent or the ink is supplied to the first ink tube 44*a* through the joining section 45, it is advantageous in eliminating the blockage, caused at the time of suction control, by the solvent or the ink.

Note that the solvent is supplied through the joining section 45 in the configuration illustrated in FIGS. 5, 7A, 7B, and the like, but the disclosure is not limited to such a configuration. As in a modified example to be described later, the ink or the printing ink may be supplied through the joining section 45.

More specifically, when the reverse-flow cleaning is performed on a flow path by the solvent, the supply control section 101*a* executes the blowing control by bringing the eighth valve V8 serving as the on-off valve into the closed state, bringing the eighteenth valve V18 serving as the second on-off valve into the open state, and operating the second pump P2 serving as the solvent pump. When the second pump P2 is operated with the eighth valve V8 in the closed state and the eighteenth valve V18 in the open state, the positive pressure can be generated as described above without generating a flow from the joining section 45 toward the ink tank 106.

—Specific Example of Blowing Control—

Figure 8A:
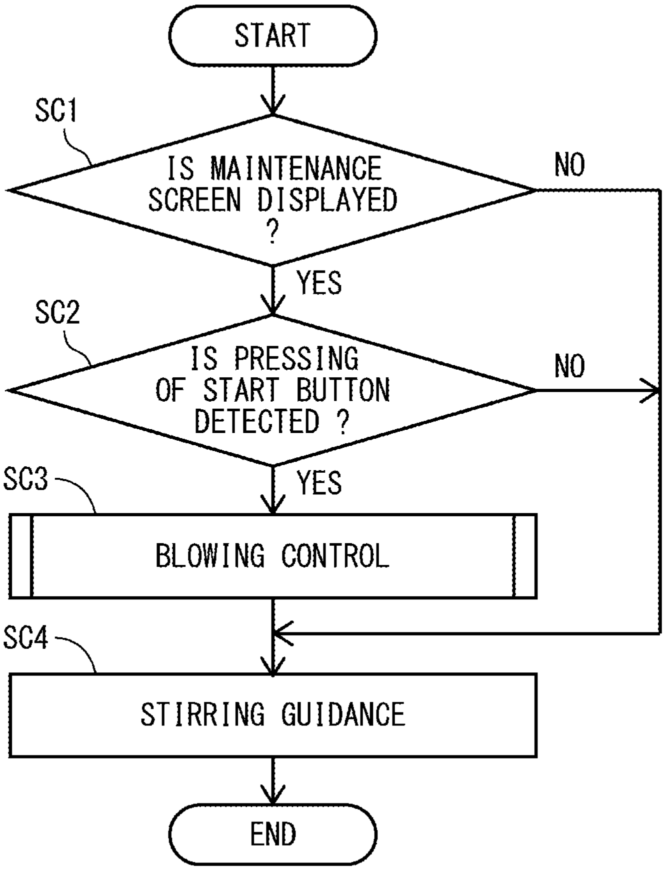
FIG. 8A is a flowchart illustrating an execution condition of blowing control.
Figure 8B:
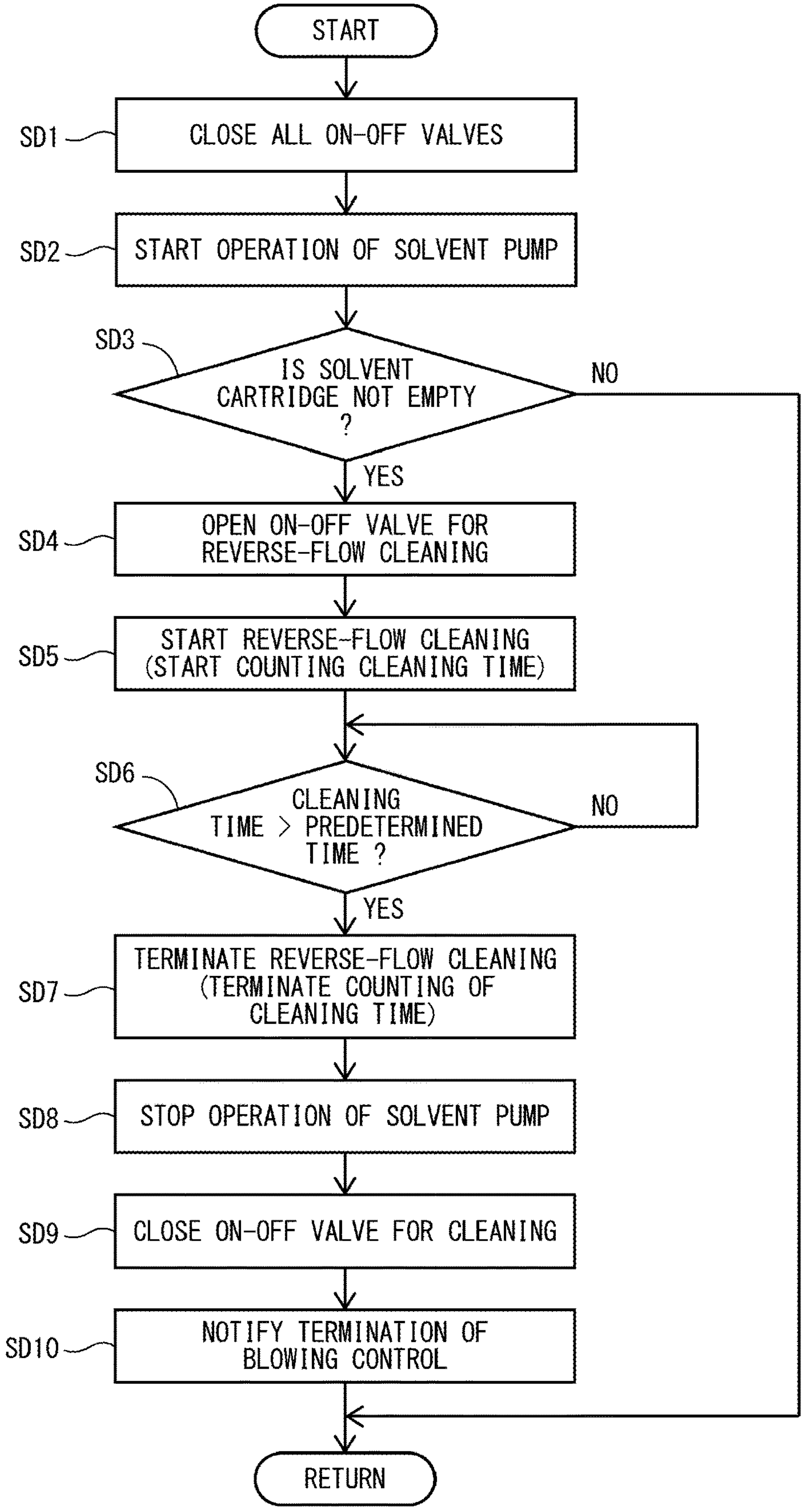
FIG. 8B is a flowchart illustrating a specific example of the blowing control.
Figure 9A:
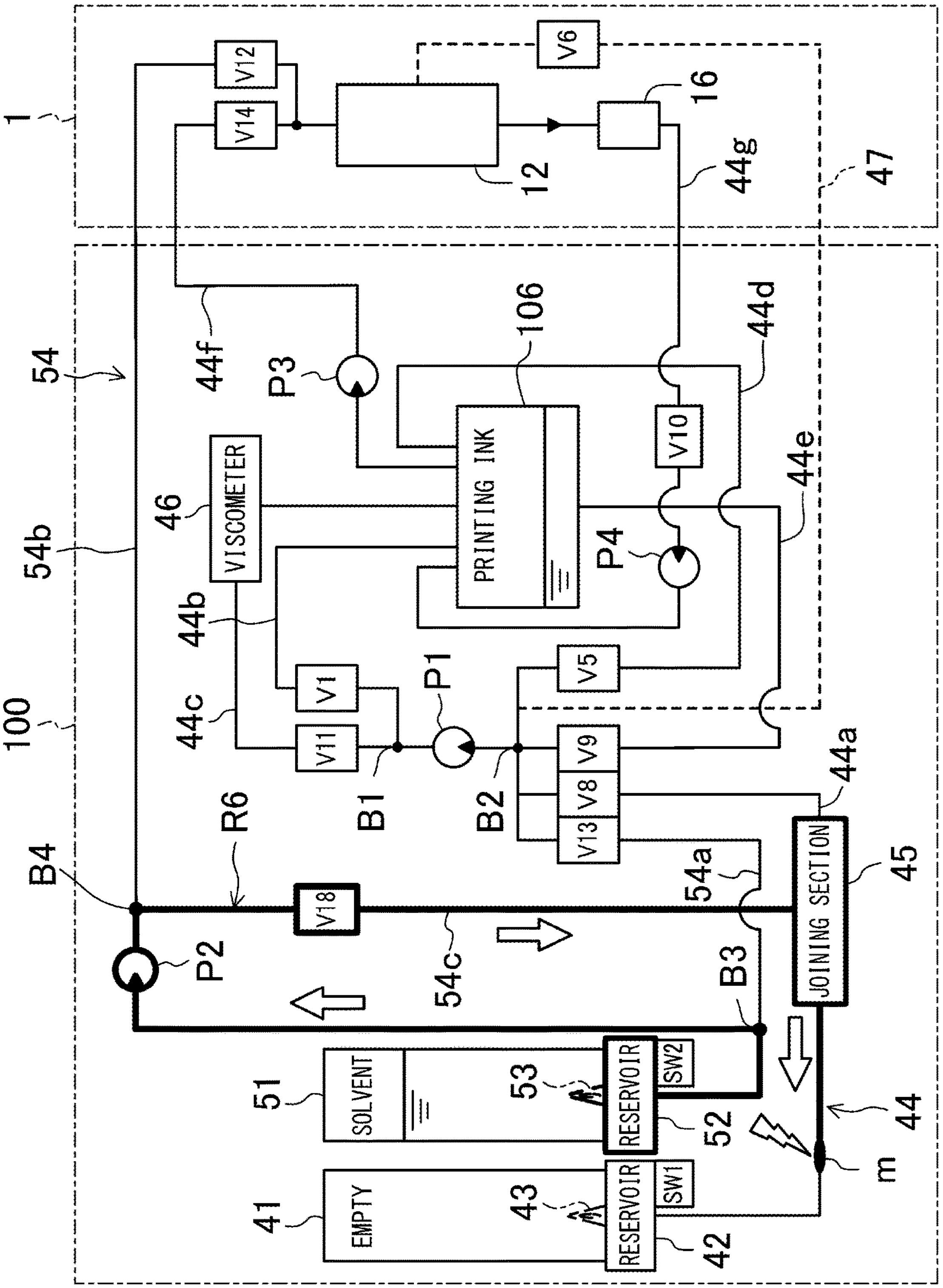
FIG. 9A is a diagram for describing a flow generated by the blowing control before blockage is eliminated.
Figure 9B:
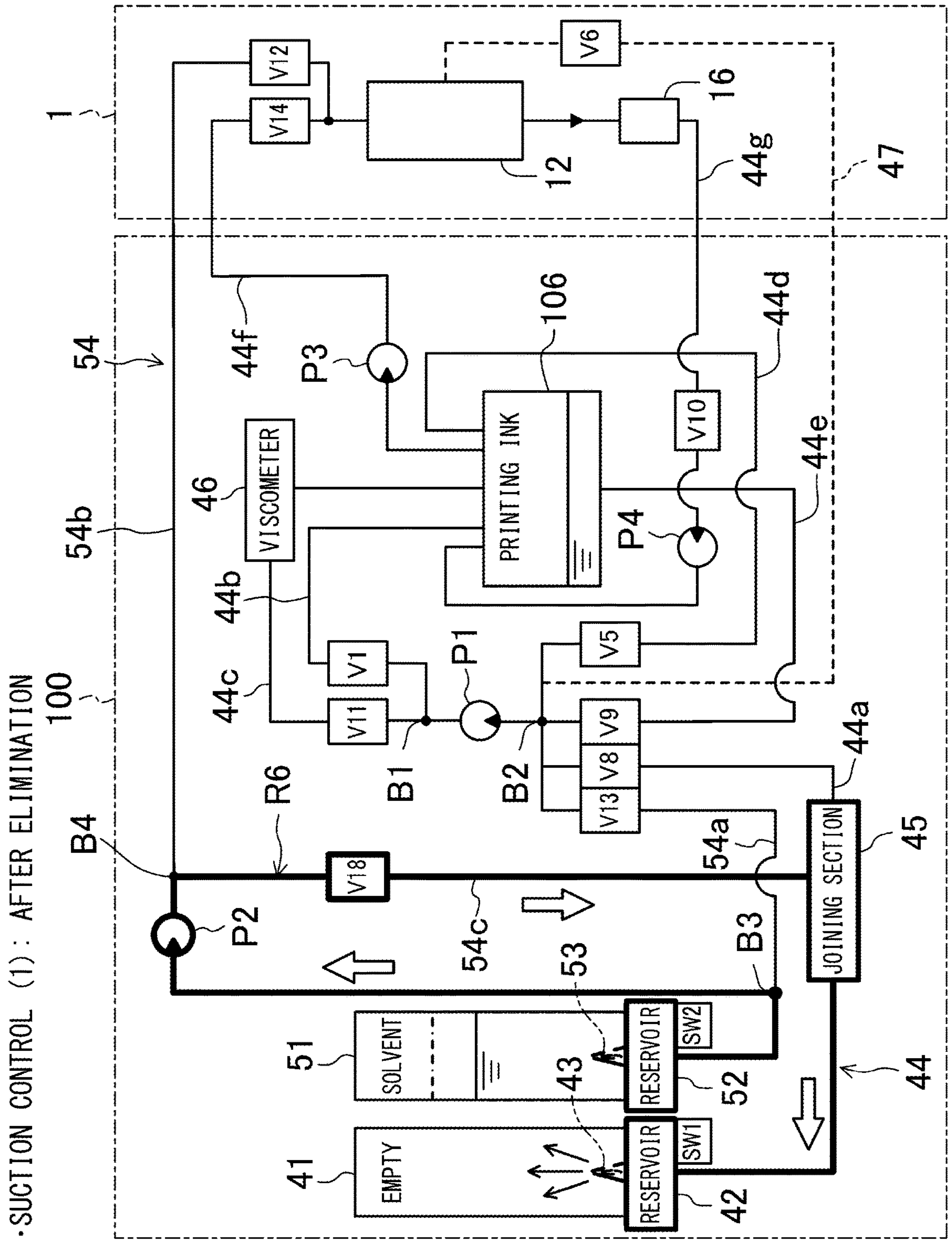
FIG. 9B is a diagram illustrating a flow generated by the blowing control after the blockage is eliminated.
Figure 10:
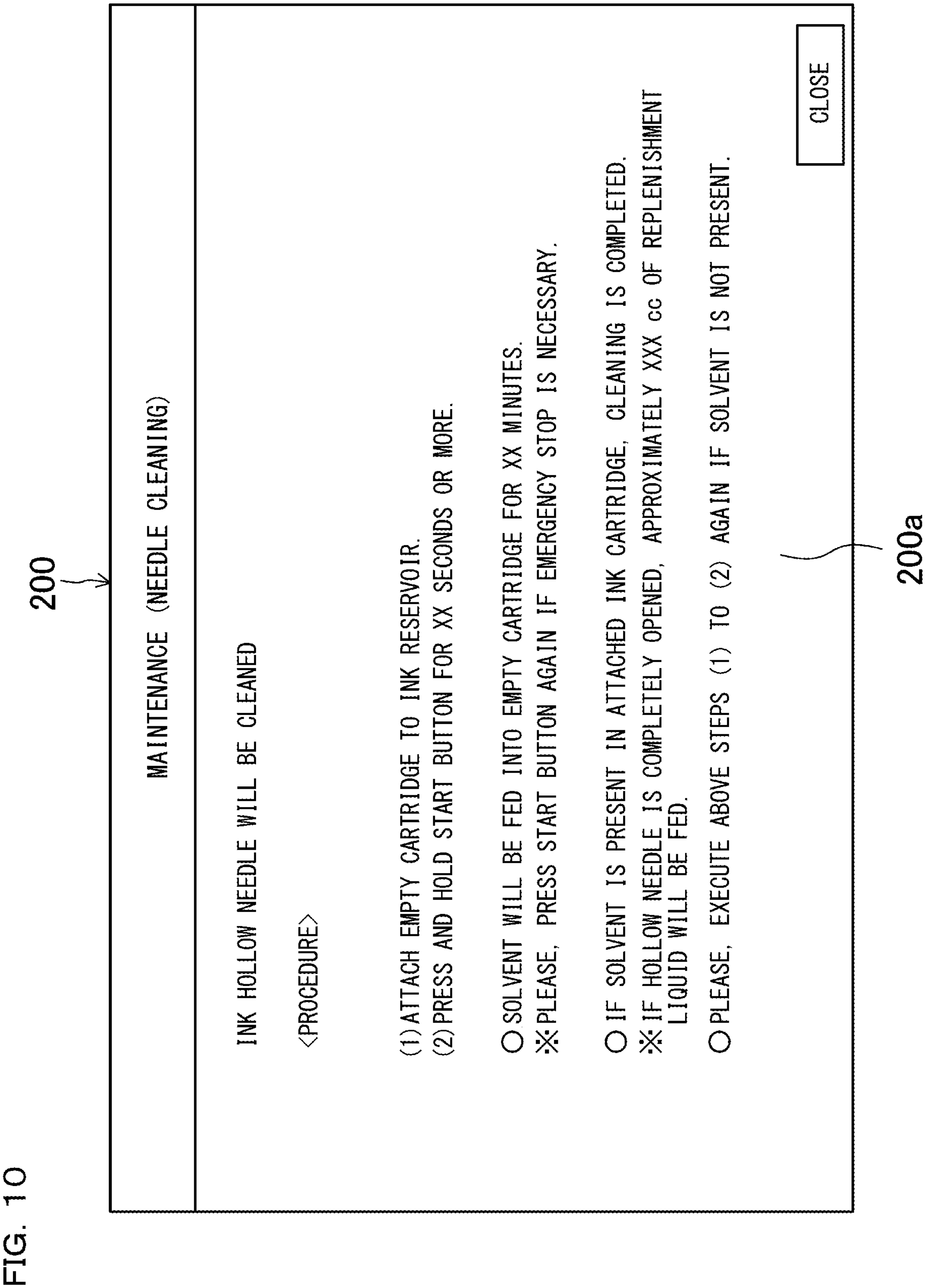
FIG. 10 is a view illustrating a first maintenance screen before the blowing control.
Figure 11:
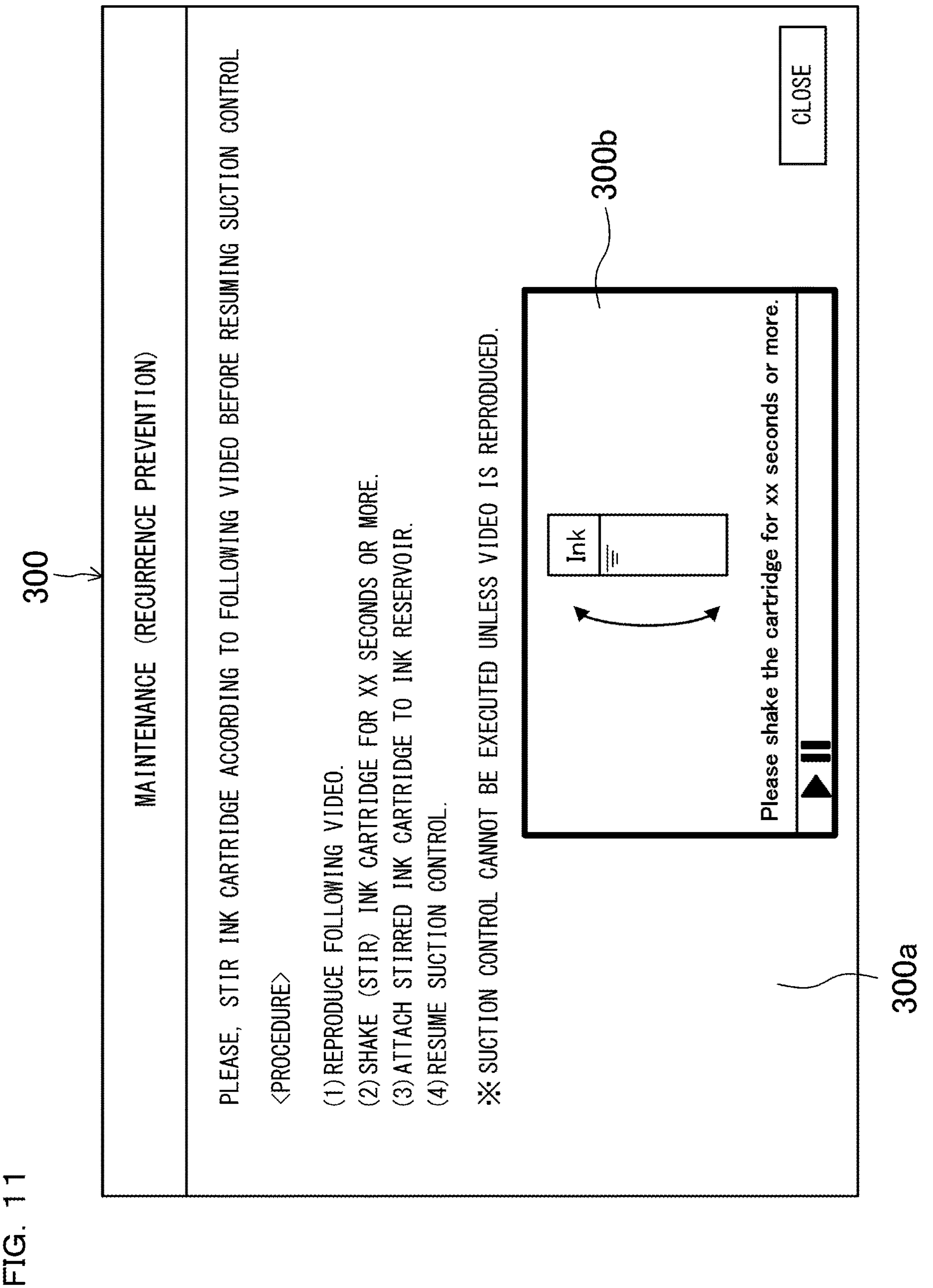
FIG. 11 is a view illustrating a second maintenance screen after the blowing control.

Hereinafter, a specific example of the blowing control will be described with reference to FIGS. 8A and 8B, FIGS. 9A and 9B. FIG. 10, and FIG. 11. FIG. 8A is a flowchart illustrating an execution condition of the blowing control, and FIG. 8B is a flowchart illustrating a specific example of the blowing control. In addition, FIG. 9A is a view illustrating a flow generated by the blowing control before blockage is eliminated, and FIG. 9B is a view illustrating a flow generated by the blowing control after the blockage is eliminated. In addition, FIG. 10 is a view illustrating a first maintenance screen 200 before the blowing control, and FIG. 11 is a view illustrating a second maintenance screen 300 after the blowing control.

First, in step SC1 of FIG. 8A, the supply control section 101*a* determines whether or not the first maintenance screen 200 as illustrated in FIG. 10 is displayed on the display section 103*a*. This determination can be made, for example, based on a control signal input from the control section 101 to the display section 103*a*. If the determination is YES, the supply control section 101*a* advances a control process to step SA2. If this determination is NO, the supply control section 101*a* terminates the flow according to FIG. 8A.

Here, the first maintenance screen 200 is a screen on which an execution procedure 200*a* of the blowing control is displayed in text as illustrated in FIG. 10. The first maintenance screen 200 can be displayed on the display section 103*a*, for example, by operating the operation section 103*b*.

On the first maintenance screen 200, "Attach empty cartridge to ink reservoir." is displayed as a first procedure. According to the first procedure, a user replaces the empty ink cartridge 41 or the empty solvent cartridge 51 with respect to the ink hollow needle 43 in which blockage has occurred. Note that, in a case where the empty ink cartridge 41 or the empty solvent cartridge 51 is not used for the blowing control, the execution of the first procedure may be omitted, or the display itself may be omitted.

In addition, "Press and hold start button for XX seconds or more." is displayed as a second procedure on the first maintenance screen 200. According to the second procedure, the user presses the start button 103*c* for a predetermined time or more.

Further, in step SC2 subsequent to step SC1 in FIG. 8A, the supply control section 101*a* detects whether or not the start button 103*c* has been pressed according to the second procedure. If this determination is NO, the supply control section 101*a* terminates the flow according to FIG. 8A.

On the other hand, if the determination in step SC2 is YES (that is, in a case where the pressing of the start button 103*c* is detected), the supply control section 101*a* advances the control process to step SC3, and executes the blowing control in step SC3.

In this manner, the supply control section 101*a* according to the present embodiment is configured to start the blowing control when the start button 103*c* is operated. Regardless of whether or not ink is contained in the ink cartridge 41 received in the ink reservoir 42, the supply control section 101*a* starts the blowing control when the start button 103*c* is operated. That is, the ink cartridge 41 received in the ink reservoir 42 at the start of the blowing control may be empty as described above or may contain ink.

Note that, before proceeding from step SC1 to step SC2, the supply control section 101*a* may determine whether or not the ink cartridge 41 containing ink, the empty ink cartridge 41, or the empty solvent cartridge 51 is mounted to the ink reservoir 42 similarly to step SA2 described above. It may be configured to skip step SC3 and terminate the flow in a case where the empty ink cartridge 41 or the empty solvent cartridge 51 is not mounted to the ink reservoir 42.

In addition, it may be configured to forcibly execute the blowing control based on a manual input of the user even in a case where the ink cartridge 41 containing ink, the empty ink cartridge 41, or the empty solvent cartridge 51 is not mounted to the ink reservoir 42.

Note that the supply control section 101*a* may start the blowing control based on a detection result obtained by the storage sensor 106*a* serving as the detector although not illustrated. In this case, the supply control section 101*a* automatically starts the blowing control as soon as the suction control is finished. Similarly, the blowing control can be automatically started in a case where sensors other than the storage sensor 106*a* are used as the detector. The ink clogging in the ink hollow needle 43 and the first ink tube 44*a* in the vicinity thereof can be more reliably eliminated by automatically starting the blowing control.

In subsequent step SC3, the supply control section 101*a* executes the blowing control. Details of the blowing control are as illustrated in steps SD1 to SD9 in FIG. 8B. It is assumed that all of the first pump P1 to the fourth pump P4 are stopped before step SD1 is started.

First, in step SD1 of FIG. 8B, the supply control section 101*a* brings all of the on-off valves in the controller 100 and the printing head 1 into the closed states (closes all the on-off valves). The on-off valves to be brought into the closed states are all of the on-off valves described with reference to FIG. 5, such as the first valve V1.

In subsequent step SD2, the supply control section 101*a* operates the second pump P2 serving as the solvent pump (start of operation of the solvent pump).

In subsequent step SD3, the supply control section 101*a* determines whether or not the solvent cartridge 51 received in the solvent reservoir 52 is not empty. This determination is processing for determining whether or not a solvent for performing the blowing control is secured. If the determination is NO (if the solvent cartridge 51 received in the solvent reservoir 52 is empty), the supply control section 101*a* terminates the flow according to FIG. 8B. If the determination is YES (if the solvent cartridge 51 received in the solvent reservoir 52 is not empty), the supply control section 101*a* advances the control process to step SD4.

Note that the determination in step SD3 can also be made as the user himself/herself confirms the solvent cartridge 51 received in the solvent reservoir 52. In this case, step SD3 performed by the supply control section 101*a* becomes unnecessary.

In subsequent step SD4, the supply control section 101*a* opens (sets an open state of) an on-off valve for reverse-flow cleaning. The on-off valve opened in step SD4 is the eighteenth valve V18 serving as the second on-off valve.

When the eighteenth valve V18 is brought into the open state, the sixth path R6 connecting the solvent cartridge 51 and the ink hollow needle 43 is constructed as indicated by the thick lines in FIGS. 9A and 9B. Since the second pump P2 is already in operation, the blowing control is started with the construction of the sixth path R6. The solvent sucked from the solvent cartridge 51 received in the solvent reservoir 52 is supplied to the first ink tube 44*a* between the joining section 45 and the ink hollow needle 43 through the sixth path R6, more specifically, the joining section 45 of the sixth path R6.

Therefore, in subsequent step SD5, the supply control section 101*a* starts counting a cleaning time (an execution time of blow-out control) with the start of reverse-flow cleaning. This counting can be performed by the timer described above.

When the blowing control is executed, a flow in a direction opposite to that at the time of the suction control is generated in the ink hollow needle 43 and the vicinity thereof as illustrated in FIG. 9B. In the example of FIG. 9B, this flow is caused by the solvent. As a result, pressure (particularly positive pressure) is applied to the ink hollow needle 43 from the downstream side as viewed from the ink hollow needle 43 as described above. This positive pressure gradually increases as the blowing control is continued. When the pressure increases to a predetermined value or more, the obstructions m clogging the internal space of the ink hollow needle 43 and the internal space of the first ink tube 44*a* in the vicinity of the ink hollow needle 43 is pushed out into the cartridge (the ink cartridge 41 containing ink, the empty ink cartridge 41, or the empty solvent cartridge 51) received in the ink reservoir 42. As a result, the blockage by the obstructions m is eliminated.

In subsequent step SD6, the supply control section 101*a* determines whether or not the cleaning time exceeds a predetermined time set in advance. This determination can be made by the above-described timer. If the determination is NO, the supply control section 101*a* repeats the determination in step SD6 while executing the blowing control. If it is determined to be NO in step SD6 and the process returns to step SD6, the supply control section 101*a* counts up the cleaning time. On the other hand, if the determination in step D6 is YES, the supply control section 101*a* advances the control process to step SD7.

That is, the supply control section 101*a* according to the present embodiment is configured to execute the blowing control over a predetermined period. In addition, the supply control section 101*a* causes the display section 103*a* serving as the notification section to notify that the blowing control is terminated after a lapse of the predetermined period. This notification may be executed after the operation of the second pump P2 is stopped or the on-off valve for cleaning (the eighteenth valve V18) is closed as in step SD10 to be described later. As in the modified example to be described later, the notification itself may be omitted.

Thereafter, in step SD7, the supply control section 101*a* terminates the counting of the cleaning time so as to terminate the reverse-flow cleaning.

In subsequent step SD8, the supply control section 101*a* stops the operation of the second pump P2 operated in step SD2 (stops the operation of the cleaning pump). Thereafter, in step SD9, the supply control section 101*a* closes the on-off valve for cleaning (the eighteenth valve V18) opened in step SD1.

In step SD10, the display section 103*a* changes a display mode based on a control signal from the supply control section 101*a* to notify the user that the blowing control is terminated. At this time, the supply control section 101*a* may notify that the reverse-flow cleaning by the blowing control has succeeded or notify that the reverse-flow cleaning has failed, for example, based on a change in the content amount of the solvent cartridge 51 received in the solvent reservoir 52.

When step SD10 is completed, the supply control section 101*a* terminates the flow illustrated in FIG. 8B and advances the control process to step SC4 in FIG. 8A. In step SC4, the display section 103*a* displays the second maintenance screen 300 illustrated in FIG. 11 by changing a display mode based on a control signal from the supply control section 101*a*.

Here, the second maintenance screen 300 is a screen displaying first guidance information 300*a* indicating procedures, which need to be performed by the user before reattaching the ink cartridge 41 to the ink reservoir 42 after completion of the blowing control, in text and second guidance information 300*b* indicating the procedures in a video as illustrated in FIG. 11. The second maintenance screen 300 may be configured to be automatically displayed on the display section 103*a* after the blowing control is completed.

Both the first guidance information 300*a* and the second guidance information 300*b* are information for guiding to shake the ink cartridge 41 to be reattached and stir a content before the ink cartridge 41 is reattached to the ink reservoir 42. The first guidance information 300*a* and the second guidance information 300*b* include, for example, information indicating a stirring time of the ink cartridge 41 and a degree of stirring (how many strokes and in which direction the ink cartridge 41 is to be shaken).

Note that it is not essential to display the first guidance information 300*a* and the second guidance information 300*b* at the same time as illustrated in FIG. 11. After the first guidance information 300*a* is displayed, the second guidance information 300*b* may be displayed subsequently.

In addition, resumption of the suction control may be restricted as long as the second guidance information 300*b* indicated in a video is not reproduced. As used herein, "restricting the resumption of the suction control" refers to, for example, disabling the suction control.

In this manner, when the blowing control by the supply control section 101*a* is terminated, the display section 103*a* according to the present embodiment displays guidance information (the first guidance information 300*a* and the second guidance information 300*b*) for guiding to stir the ink cartridge 41 received in the ink reservoir 42.

<Modified Example of Blowing Control>

Although the ink clogging is eliminated by causing the solvent to flow in the blowing control in the embodiment, the disclosure is not limited to such a configuration. As in a modified example to be described hereinafter, the ink clogging may be eliminated by causing ink to flow in the blowing control.

Figure 12:
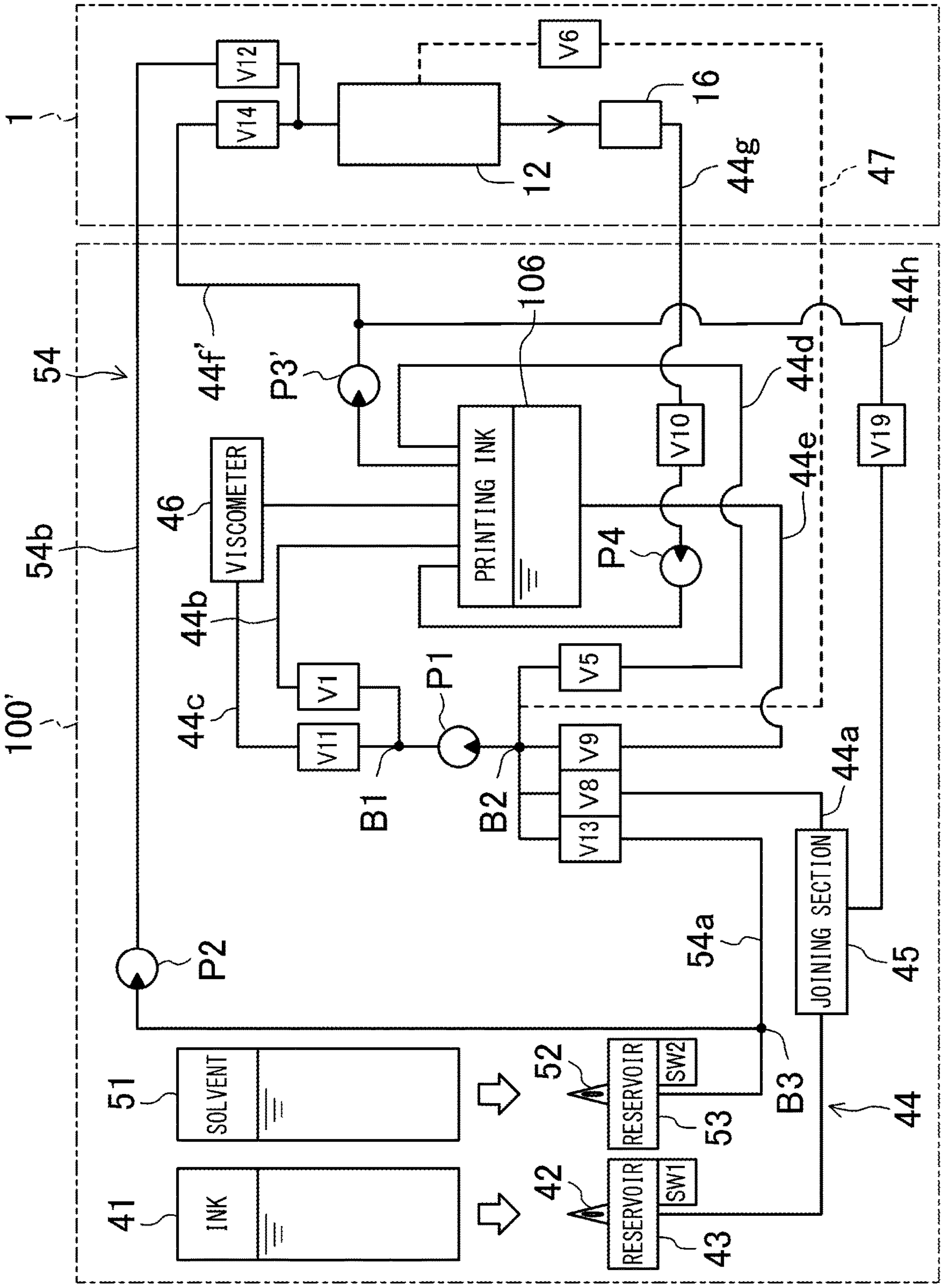
FIG. 12 is a diagram illustrating a controller configured to implement a modified example of the blowing control, which corresponds to FIG. 5.
Figure 13:
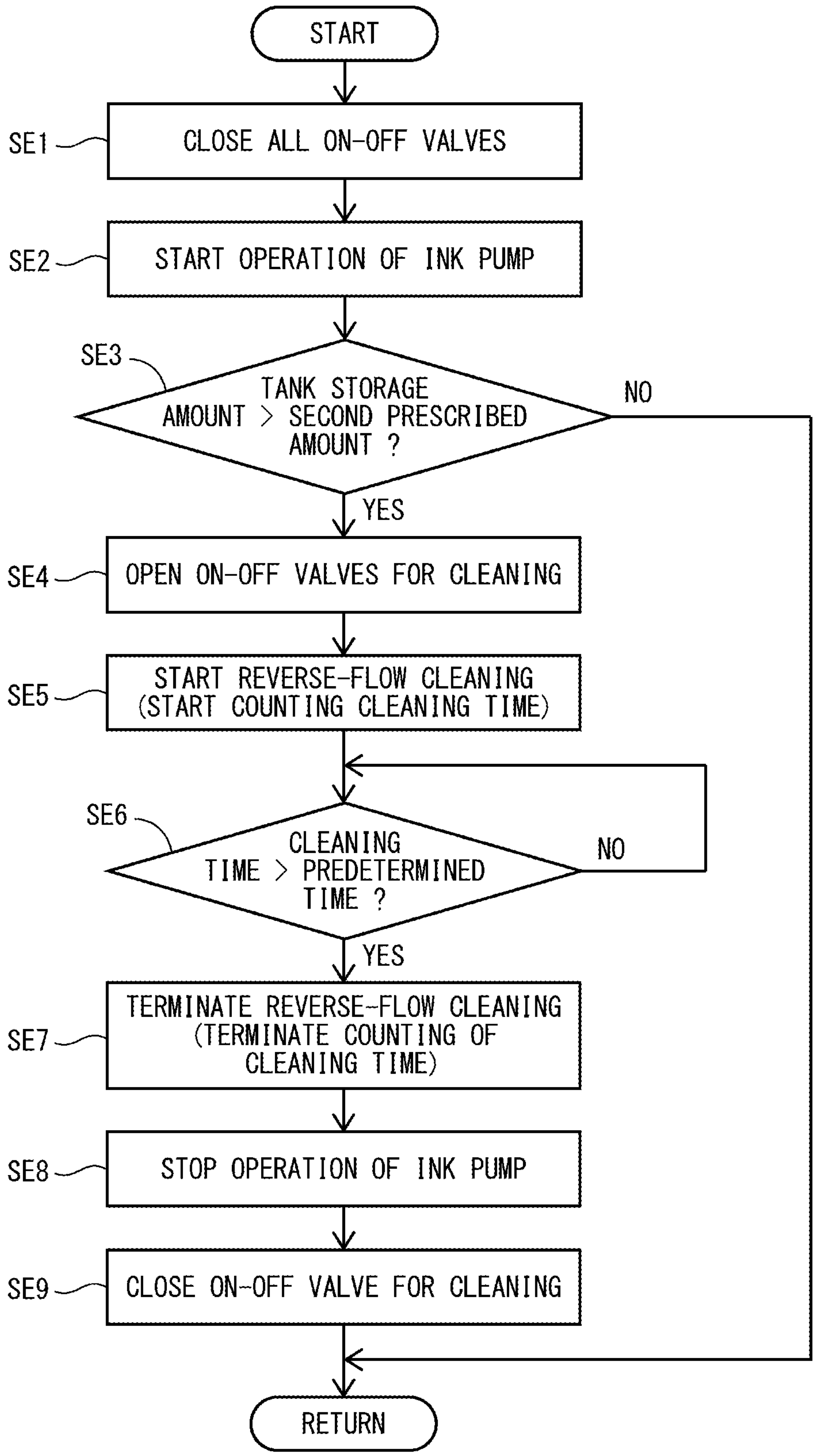
FIG. 13 is a view of the modified example of the blowing control, which corresponds to FIG. 8B.
Figure 14A:
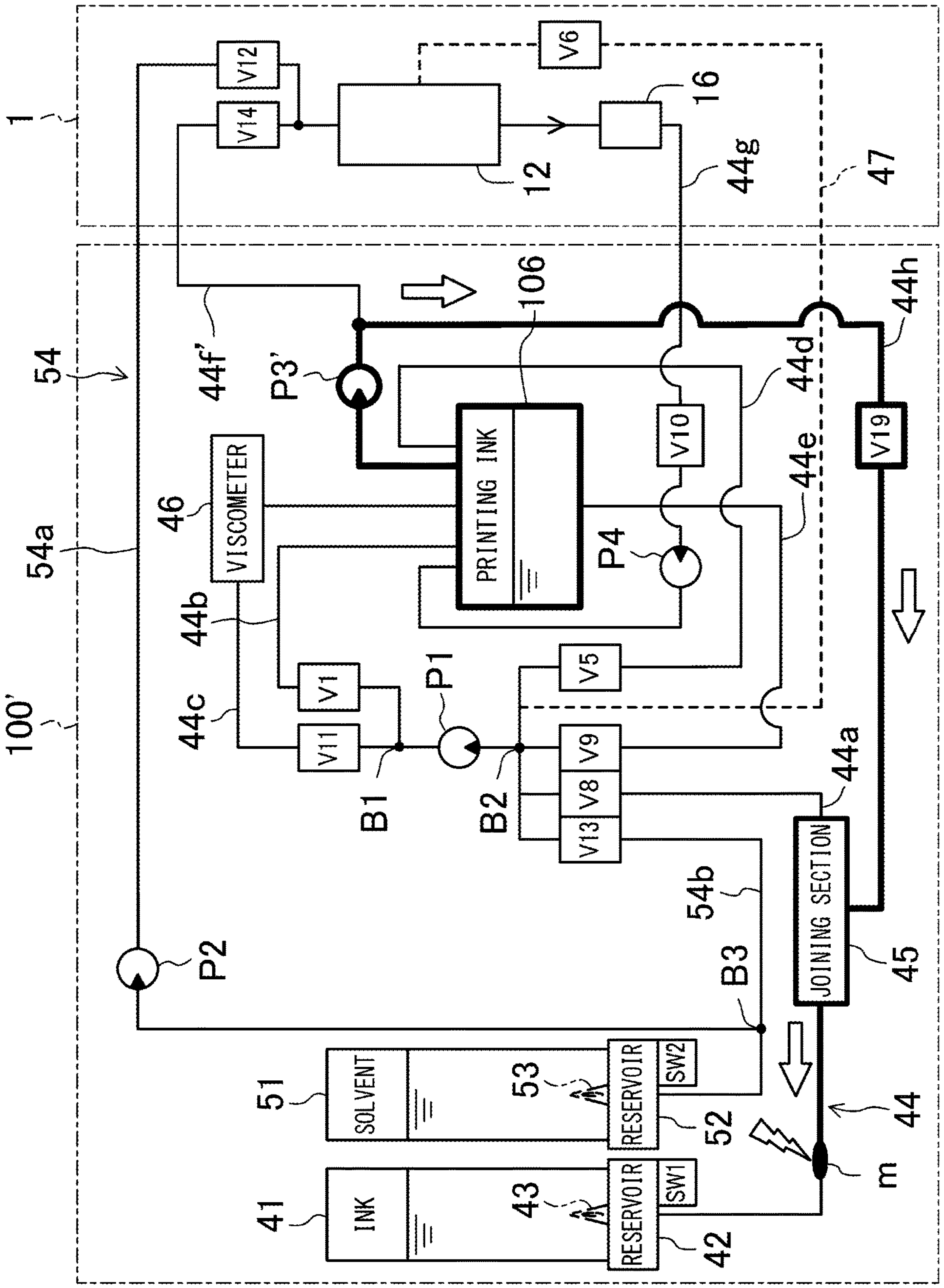
FIG. 14A is a diagram of the modified example of the blowing control, which corresponds to FIG. 9A.
Figure 14B:
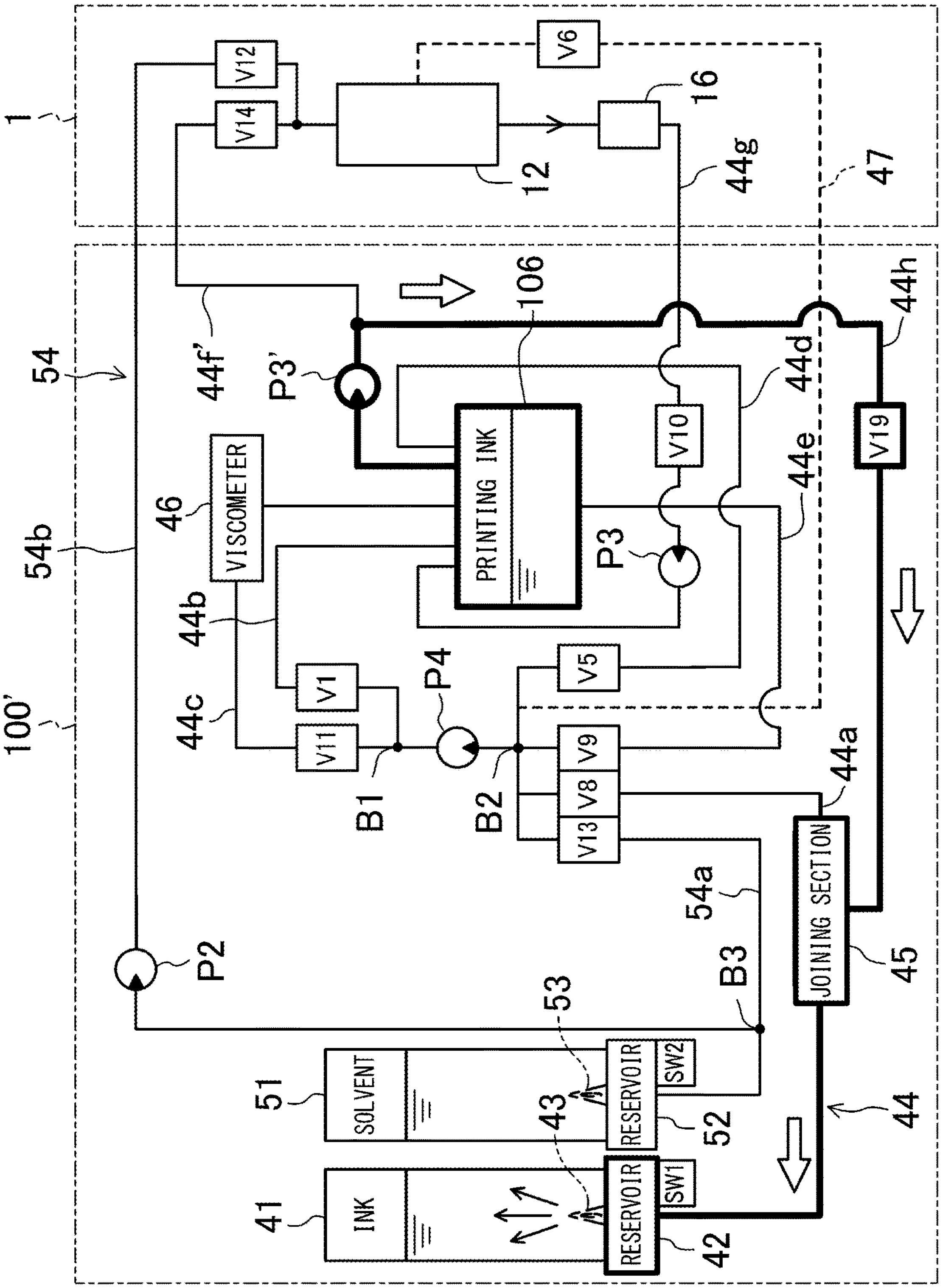
FIG. 14B is a diagram of the modified example of the blowing control, which corresponds to FIG. 9B.

FIG. 12 is a diagram illustrating a controller 100' configured to implement the modified example of the blowing control, which corresponds to FIG. 5. FIG. 13 is a view of the modified example of the blowing control, which corresponds to FIG. 8B. In addition, FIG. 14A is a diagram of the modified example of the blowing control, which corresponds to FIG. 9A, and FIG. 14B is a diagram of the modified example of the blowing control, which corresponds to FIG. 9B.

In order to implement the blowing control using ink, the controller 100' according to the modified example has some configurations different from those of the controller 100 in FIG. 5. As illustrated in FIG. 12, the controller 100' according to the modified example includes an eighth ink tube 44*h* serving as a second ink flowing tube and a nineteenth valve V19 serving as a third on-off valve instead of the third solvent tube 54*c* and the eighteenth valve V18 illustrated in FIG. 5 and the like.

In this modified example, the eighth ink tube 44*h* has one end portion connected to the ink tank 106 and the other end portion connected to the joining section 45. The eighth ink tube 44*h* serving as the second ink flowing tube connects the ink tank 106 and the joining section 45, and causes a printing ink to flow from the ink tank 106 to the joining section 45.

In addition, a third pump P3' according to the modified example is arranged in the middle of the eighth ink tube 44*h*. The third pump P3' according to the modified example is an ink pump that operates so as to generate a flow from the eighth ink tube 44*h* toward the ink hollow needle 43 through the joining section 45 and the first ink tube 44*a*.

In addition, the nineteenth valve V19 is arranged in the eighth ink tube 44*h* between the joining section 45 and the third pump P3'. The nineteenth valve V19 is the third on-off valve that opens and closes a flow channel of the eighth ink tube 44*h*.

Note that a sixth ink tube 44*f'* according to the modified example is connected to not the ink tank 106 but the eighth ink tube 44*h* between the third pump P3' and the nineteenth valve V19 with an arrangement change of the third pump P3'. Functions performed by the third pump P3' and the sixth ink tube 44*f'* when the printing ink is supplied to the printing head 1 are similar to those in the embodiment.

In this modified example, when ink is taken out from the ink cartridge 41 received by the ink reservoir 42, the supply control section 101*a* executes suction control by bringing the nineteenth valve V19 serving as the third on-off valve into a closed state in addition to bringing the eighth valve V8 into an open state and operating the first pump P1. Bringing the nineteenth valve V19 into the closed state is a difference from the suction control in the embodiment.

Further, when reverse-flow cleaning is performed in a flow path, the supply control section 101*a* executes blowing control by bringing the nineteenth valve V19 into an open state in addition to bringing the eighth valve V8 into a closed state and operating the ink pump. Bringing the nineteenth valve V19 into the closed state and supplying the ink or the printing ink to the joining section 45 are differences from the blowing control in the embodiment.

Hereinafter, the modified example of the blowing control will be specifically described with reference to FIGS. 13, 14A, and 14B. First, processing according to FIG. 8A (processing according to an execution condition of the blowing control) is the same as that in the embodiment, and thus, the description thereof is omitted. In addition, it is assumed that all of the first pump P1, the second pump P2, the third pump P3', and the fourth pump P4 are stopped before step SE1 in FIG. 13 is started.

First, in step SE1 of FIG. 13, the supply control section 101*a* brings all of the on-off valves in the controller 100 and the printing head 1 into the closed states (closes all the on-off valves). The on-off valves to be brought into the closed states are all of the on-off valves illustrated in FIG. 12, such as the first valve V1.

In subsequent step SE2, the supply control section 101*a* operates the third pump P3' serving as the ink pump (start of operation of the ink pump).

In subsequent step SE3, the supply control section 101*a* determines whether or not a storage amount (tank storage amount) of the printing ink in the ink tank 106 exceeds a second prescribed amount determined in advance. This determination can be made based on, for example, a detection signal of the storage sensor 106*a*. In addition, the second prescribed amount to be compared in step SE3 is set in advance. This determination is processing for determining whether or not the ink or the printing ink for performing the blowing control is secured. If the determination is NO (if the ink or the printing ink is insufficient), the supply control section 101*a* terminates the flow according to FIG. 13. If the determination is YES (if the ink or the printing ink is sufficiently secured), the supply control section 101*a* advances a control process to step SE4.

Note that the determination in step SE3 is not essential. A user himself/herself may confirm the tank storage amount through the display section 103*a* or the like.

In subsequent step SE4, the supply control section 101*a* opens (sets an open state of) an on-off valve for reverse-flow cleaning. The on-off valve opened in step SE4 is the nineteenth valve V19 serving as the third on-off valve.

When the nineteenth valve V19 is brought into the open state, a path for the ink or the printing ink, the path connecting the ink tank 106 and the ink hollow needle 43, is constructed as indicated by the thick lines in FIGS. 14A and 14B. Since the third pump P3' is already in operation, the blowing control is started with the construction of this path. The ink or the printing ink sucked from the ink tank 106 is supplied to the first ink tube 44*a* between the joining section 45 and the ink hollow needle 43 through the path, more specifically, the joining section 45 arranged in the middle of the path.

Therefore, in subsequent step SE5, the supply control section 101*a* starts counting a cleaning time (an execution time of blow-out control) with the start of reverse-flow cleaning. This counting can be performed by the timer described above.

When the blowing control is executed, a flow in a direction opposite to that at the time of the suction control is generated in the ink hollow needle 43 and the vicinity thereof as illustrated in FIG. 14B. In the example of FIG. 14B, this flow is caused by the ink or the printing ink. As a result, pressure (particularly positive pressure) is applied to the ink hollow needle 43 from the downstream side as viewed from the ink hollow needle 43. This positive pressure gradually increases as the blowing control is continued. When the pressure increases to a predetermined value or more, the obstructions m clogging the internal space of the ink hollow needle 43 and the internal space of the first ink tube 44*a* in the vicinity of the ink hollow needle 43 is pushed out into the cartridge (the ink cartridge 41 containing ink, the empty ink cartridge 41, or the empty solvent cartridge 51) received in the ink reservoir 42. As a result, the blockage by the obstructions m is eliminated.

In subsequent step SE6, the supply control section 101*a* determines whether or not the cleaning time exceeds a predetermined time set in advance. This determination can be made by the above-described timer. If the determination is NO, the supply control section 101*a* repeats the determination in step SE6 while executing the blowing control. If it is determined to be NO in step SE6 and the process returns to step SE6, the supply control section 101*a* counts up the cleaning time. On the other hand, if the determination in step D6 is YES, the supply control section 101*a* advances the control process to step SE7.

That is, the supply control section 101*a* according to the present embodiment is configured to execute the blowing control over a predetermined period. Thereafter, in step SE7, the supply control section 101*a* terminates the counting of the cleaning time so as to terminate the reverse-flow cleaning.

In subsequent step SE8, the supply control section 101*a* stops the operation of the third pump P3' operated in step SE2 (stops the operation of the ink pump). Thereafter, in step SE9, the supply control section 101*a* closes the on-off valve for cleaning (the nineteenth valve V19) opened in step SE1.

<Regarding Prevention of Failure Caused by Clogging>

As described above, the flow from the first ink tube 44*a* toward the ink hollow needle 43 can be generated by executing the blowing control illustrated in FIGS. 8B, 9A, 9B, 13, 14A, 14B, and the like according to the embodiment. With this flow, the obstructions m clogging the internal space of the ink hollow needle 43 and the vicinity thereof can be discharged from the internal space.

At this time, when the flow in the opposite direction is used instead of the flow from the ink hollow needle 43 toward the first ink tube 44*a* as in the suction control, it is possible to more reliably discharge the obstructions m without driving the obstructions m to a deep portion of the first ink tube 44*a*. Thus, it is possible to prevent a failure of the ink jet printer I due to the ink clogging in the ink hollow needle 43 and the vicinity thereof.

In addition, the replacement of the ink hollow needle 43 and the first ink tube 44*a* becomes unnecessary by discharging the obstructions m using the blowing control. The ink clogging in the ink hollow needle 43 and the vicinity thereof can be eliminated without sending the printer to a manufacturer or inviting a repair person from the manufacturer. This is also advantageous in terms of labor and cost.

In addition, in general, the pigment ink has an advantage that a color is clear and coloring power is strong, but has a disadvantage that a part of the coloring component (pigment component) settles to form a lump unless periodic stirring is performed. Thus, the pigment ink is more likely to clog the ink hollow needle 43 and the first ink tube 44*a* in the vicinity thereof as compared with the dye ink. Therefore, the embodiment is particularly effective in the case of using the ink made of the pigment ink.

In addition, the on-off valve (the eighth valve V8) that is in the open state at the time of the suction control is brought into the closed state when the blowing control is executed as illustrated in step SD1 of FIG. 8B, step SE1 of FIGS. 9A and 9B, step SE1 of FIG. 13, and FIGS. 14A and 14B. This prevents the solvent or the ink supplied via the joining section 45 from being drawn into the first pump P1 side, and the reverse-flow cleaning can be more appropriately performed.

In addition, the supply control section 101*a* supplies the solvent from the solvent cartridge 51 to the joining section 45 to execute the blowing control as illustrated in step SD4 of FIG. 8B and FIGS. 9A and 9B. This makes it possible to implement the blowing control without preparing a new fluid to be flowed at the time of reverse-flow cleaning. This can reduce the manufacturing cost of the printer and make it more advantageous in terms of cost. In addition, the ink clogging can be dissolved with the solvent by executing the blowing control with the solvent. As a result, the ink clogging occurring in the ink hollow needle 43 and the first ink tube 44*a* in the vicinity thereof can be more reliably eliminated.

In addition, the supply control section 101*a* supplies the printing ink from the ink tank 106 to the joining section 45 to execute the blowing control as illustrated in step SE4 of FIG. 13 and FIGS. 14A and 14B. This makes it possible to implement the blowing control without preparing a new fluid to be flowed at the time of reverse-flow cleaning. This can reduce the manufacturing cost of the printer and make it more advantageous in terms of cost.

In addition, the blowing control can be manually started in the embodiment as described with reference to step SC2 in FIG. 8A. As a result, the ink clogging occurring in the ink hollow needle 43 and the first ink tube 44*a* in the vicinity thereof can be eliminated at a timing desired by the user.

In addition, if ink is contained in the ink cartridge 41, the ink or the solvent discharged into the ink cartridge 41 by the blowing control will be mixed with the previously contained ink. This may increase or decrease an ink concentration in the cartridge. However, in the case of the continuous ink jet printer I, an ink concentration is adjusted in the ink tank 106. Thus, even if the ink concentration increases or decreases in the cartridge, the influence on printing by the printing head 1 can be minimized.

In addition, the recurrence of ink clogging can be suppressed by displaying the first and second guidance information 300*a* and 300*b* to the user through the display section 103*a* as described with reference to FIG. 11. As a result, it is possible to more reliably prevent the failure of the ink jet printer I due to the ink clogging in the ink hollow needle 43 and the first ink tube 44*a* in the vicinity thereof.

What is claimed is:

1. A continuous ink jet printer comprising:

an ink reservoir that detachably receives an ink cartridge in which ink is contained;

a solvent reservoir that detachably receives a solvent cartridge in which a solvent is contained;

an ink tank that stores, as a printing ink, the ink from the ink cartridge received in the ink reservoir and the solvent from the solvent cartridge received in the solvent reservoir;

a printing head that performs printing with the printing ink from the ink tank;

a hollow needle body that accesses the ink in the ink cartridge when the ink reservoir receives the ink cartridge;

a connecting portion in which a flow channel connected to the hollow needle body is formed, the connecting portion fixing the hollow needle body to the ink reservoir;

an ink flowing tube that connects the ink tank and the connecting portion and causes the ink to flow from the connecting portion to the ink tank; and a supply control section that executes first control to generate a flow from the connecting portion to the ink flowing tube in a predetermined direction and executes second control to generate a reverse-flow from the ink flowing tube to the connecting portion in an opposite direction to the predetermined direction.

2. The ink jet printer according to claim 1, wherein the ink is made of a pigment ink.

3. The ink jet printer according to claim 1, further comprising:

a suction pump that is arranged in a middle of the ink flowing tube and configured to perform suction to generate the flow from the connecting portion to the ink flowing tube;

a joining section that is arranged in the ink flowing tube between the connecting porting and the suction pump and causes the solvent or the ink to join in the ink flowing tube; and an on-off valve that is arranged in the ink flowing tube between the joining section and the suction pump and opens and closes a flow channel of the ink flowing tube, wherein the supply control section executes the first control by bringing the on-off valve into an open state and operating the suction pump when the ink is taken out from the ink cartridge received in the ink reservoir, and executes the second control by bringing the on-off valve into a closed state and supplying the solvent or the ink via the joining section when the reverse-flow cleaning is performed on the path of the flow.

4. The ink jet printer according to claim 3, further comprising:

a solvent flowing tube that causes the solvent to flow in the solvent cartridge to the joining section when the solvent reservoir receives the solvent cartridge;

a solvent pump that is arranged in a middle of the solvent flowing tube and operated to generate a flow from the solvent flowing tube to the connecting portion via the joining section and the ink flowing tube; and a second on-off valve that is arranged in the solvent flowing tube between the joining section and the solvent pump and opens and closes a flow channel of the solvent flowing tube, wherein the supply control section executes the first control by bringing the on-off valve into the open state, bringing the second on-off valve into a closed state, and operating the suction pump when the ink is taken out from the ink cartridge received in the ink reservoir, and executes the second control by bringing the on-off valve into the closed state, bringing the second on-off valve to an open state, and operating the solvent pump when the reverse-flow cleaning is performed on the path of the flow.

5. The ink jet printer according to claim 3, further comprising a second ink flowing tube that connects the ink tank and the joining section and causes the printing ink to flow from the ink tank to the joining section;

an ink pump that is arranged in a middle of the second ink flowing tube and operated to generate a flow from the second ink flowing tube to the connecting portion via the joining section and the ink flowing tube; and a third on-off valve that is arranged in the second ink flowing tube between the joining section and the ink pump and opens and closes a flow channel of the second ink flowing tube, wherein the supply control section executes the first control by bringing the on-off valve into the open state, bringing the third on-off valve into a closed state, and operating the suction pump when the ink is taken out from the ink cartridge received in the ink reservoir, and executes the second control by bringing the on-off valve into the closed state, bringing the third on-off valve to an open state, and operating the ink pump when the reverse-flow cleaning is performed on the path of the flow.

6. The ink jet printer according to claim 3, further comprising a detector that detects a blocked state in the connecting portion and a blocked state in the ink flowing tube between the connecting portion and the joining section, wherein the supply control section starts the second control based on a detection result of the detector.

7. The ink jet printer according to claim 1, further comprising a switch electrically connected to the supply control section, wherein the supply control section starts the second control when the switch is operated.

8. The ink jet printer according to claim 7, wherein the supply control section starts the second control when the switch is operated, regardless of whether or not the ink cartridge received in the ink reservoir contains the ink.

9. The ink jet printer according to claim 1, further comprising a notification section that notifies a user of information, wherein the supply control section executes the second control over a predetermined period, and causes the notification section to notify that the second control is terminated after a lapse of the predetermined period.

10. The ink jet printer according to claim 1, further comprising a display section that displays information to a user, wherein the display section displays guidance information for guiding the user to stir the ink cartridge to be received in the ink reservoir when the second control by the supply control section is terminated.

11. The ink jet printer according to claim 1, wherein the first control is executed so that the ink is taken out from the ink cartridge received in the ink reservoir, and the second control is executed so that an obstruction clogged in the ink flowing tube or in the connecting portion is pushed out.

12. A continuous ink jet printer comprising:

an ink reservoir that detachably receives an ink cartridge in which ink is contained;

a solvent reservoir that detachably receives a solvent cartridge in which a solvent is contained;

an ink tank that stores, as a printing ink, the ink from the ink cartridge received in the ink reservoir and the solvent from the solvent cartridge received in the solvent reservoir;

a printing head that performs printing with the printing ink from the ink tank;

a hollow needle body that accesses the ink in the ink cartridge when the ink reservoir receives the ink cartridge;

a connecting portion in which a flow channel connected to the hollow needle body is formed, the connecting portion fixing the hollow needle body to the ink reservoir;

an ink flowing tube that connects the ink tank and the connecting portion, and causes the ink to flow from the connecting portion to the ink tank;

a supply control section that executes first control to generate a flow from the connecting portion to the ink flowing tube in a predetermined direction, and executes second control to generate a reverse-flow from the ink flowing tube to the connecting portion in an opposite direction to the predetermined direction;

a suction pump that is arranged in a middle of the ink flowing tube and configured to perform suction to generate the flow from the connecting portion to the ink flowing tube;

a joining section that is arranged in the ink flowing tube between the connecting portion and the suction pump and causes the solvent or the ink to join in the ink flowing tube; and an on-off valve that is arranged in the ink flowing tube between the joining section and the suction pump and opens and closes a flow channel of the ink flowing tube, wherein the supply control section executes the first control by bringing the on-off valve into an open state and operating the suction pump when the ink is taken out from the ink cartridge received in the ink reservoir, and executes the second control by bringing the on-off valve into a closed state and supplying the solvent or the ink via the joining section when the reverse-flow cleaning is performed on the path of the flow.

13. A continuous ink jet printer comprising:

an ink reservoir that detachably receives an ink cartridge in which ink is contained;

a solvent reservoir that detachably receives a solvent cartridge in which a solvent is contained;

an ink tank that stores, as a printing ink, the ink from the ink cartridge received in the ink reservoir and the solvent from the solvent cartridge received in the solvent reservoir;

a printing head that performs printing with the printing ink from the ink tank;

a hollow needle body that accesses the ink in the ink cartridge when the ink reservoir receives the ink cartridge;

a connecting portion in which a flow channel connected to the hollow needle body is formed, the connecting portion fixing the hollow needle body to the ink reservoir;

an ink flowing tube that connects the ink tank and the connecting portion, and causes the ink to flow from the connecting portion to the ink tank;

a supply control section that executes first control to generate a flow from the connecting portion to the ink flowing tube in a predetermined direction, and executes second control to generate a reverse-flow from the ink flowing tube to the connecting portion in an opposite direction to the predetermined direction; and a switch electrically connected to the supply control section, wherein the supply control section starts the second control when the switch is operated.

* * * * *